(12) United States Patent
Walsh et al.

(10) Patent No.: US 12,112,521 B2
(45) Date of Patent: Oct. 8, 2024

(54) ROOM ACOUSTICS SIMULATION USING DEEP LEARNING IMAGE ANALYSIS

(71) Applicant: DTS, Inc., Calabasas, CA (US)

(72) Inventors: Martin Walsh, Calabasas, CA (US); Aoife McDonagh, Calabasas, CA (US); Michael M. Goodwin, Calabasas, CA (US); Edward Stein, Calabasas, CA (US); Peter Corcoran, Calabasas, CA (US)

(73) Assignee: DTS Inc., Calabasas, CA (US)

( * ) Notice: Subject to any disclaimer, the term of this patent is extended or adjusted under 35 U.S.C. 154(b) by 165 days.

(21) Appl. No.: 17/354,668

(22) Filed: Jun. 22, 2021

(65) Prior Publication Data

US 2022/0101623 A1 Mar. 31, 2022

Related U.S. Application Data

(63) Continuation of application No. PCT/US2019/066315, filed on Dec. 13, 2019.

(60) Provisional application No. 62/784,648, filed on Dec. 24, 2018.

(51) Int. Cl.
*G06V 10/764* (2022.01)
*G01H 7/00* (2006.01)
*G06V 20/20* (2022.01)
*G06V 20/64* (2022.01)

(52) U.S. Cl.
CPC ............ *G06V 10/764* (2022.01); *G01H 7/00* (2013.01); *G06V 20/20* (2022.01); *G06V 20/64* (2022.01)

(58) Field of Classification Search
CPC .......... G06F 30/27; G06F 30/20; G06F 30/13; G06F 18/2413; G06F 2119/10; G06F 3/165; G06N 3/08; G06N 3/02; G06V 10/82; G06V 10/764; G06V 20/20; G06V 20/64; G06V 20/10; G06T 2200/04; G06T 2207/20081; G01H 7/00; G01H 15/00; G01H 17/00; H04R 29/00; H04S 2400/11; H04S 2420/01
See application file for complete search history.

(56) References Cited

U.S. PATENT DOCUMENTS

| 6,738,479 B1 | 5/2004 | Sibbald et al. |
| 6,894,714 B2 | 5/2005 | Gutta et al. |
| 7,203,635 B2 | 4/2007 | Oliver et al. |

(Continued)

FOREIGN PATENT DOCUMENTS

JP 2014-049118 A 3/2014

OTHER PUBLICATIONS

3D Working Group of the Interactive Audio Special Interest Group, "Interactive 3D Audio Rendering Guidelines: Level 2.0", Published by: MIDI Manufacturers Association, Los Angeles CA (1999).

(Continued)

*Primary Examiner* — Gandhi Thirugnanam
(74) *Attorney, Agent, or Firm* — Lerner David LLP

(57) ABSTRACT

A method comprises: receiving an image of a real-world environment; using a machine learning classifier, classifying the image to produce classifications associated with acoustic presets for an acoustic environment simulation, the acoustic presets each including acoustic parameters that represent sound reverberation; and selecting an acoustic preset among the acoustic presets based on the classifications.

20 Claims, 26 Drawing Sheets

(56) References Cited

U.S. PATENT DOCUMENTS

| | | |
|---|---|---|
| 7,330,197 B2 | 2/2008 | Kobayashi et al. |
| 7,409,423 B2 | 8/2008 | Horvitz et al. |
| 7,415,414 B2 | 8/2008 | Azara et al. |
| 7,689,521 B2 | 3/2010 | Nodelman et al. |
| 7,792,674 B2 | 9/2010 | Dalton, Jr. et al. |
| 7,801,836 B2 | 9/2010 | Sureka |
| 8,140,188 B2 | 3/2012 | Takemitsu et al. |
| 8,254,393 B2 | 8/2012 | Horvitz |
| 8,301,406 B2 | 10/2012 | Lee et al. |
| 8,392,188 B1 | 3/2013 | Riccardi |
| 8,396,671 B2 | 3/2013 | Jojic et al. |
| 8,484,146 B2 | 7/2013 | Movellan et al. |
| 8,542,250 B2 | 9/2013 | Baseley et al. |
| 8,660,679 B2 | 2/2014 | Kurabayashi et al. |
| 8,767,968 B2 | 7/2014 | Flaks et al. |
| 8,775,427 B2 | 7/2014 | Birdwell et al. |
| 8,775,428 B2 | 7/2014 | Birdwell et al. |
| 8,788,270 B2 | 7/2014 | Patel et al. |
| 9,015,093 B1 | 4/2015 | Commons |
| 9,053,431 B1 | 6/2015 | Commons |
| 9,104,189 B2 | 8/2015 | Berges Gonzalez et al. |
| 9,197,977 B2 | 11/2015 | Mahabub et al. |
| 9,292,085 B2 | 3/2016 | Bennett et al. |
| 9,398,393 B2 | 7/2016 | Antani et al. |
| 9,417,692 B2 | 8/2016 | Lamb et al. |
| 9,442,496 B1 | 9/2016 | Beckman et al. |
| 9,449,613 B2 | 9/2016 | Peters et al. |
| 9,462,387 B2 | 10/2016 | Oomen et al. |
| 9,497,501 B2 | 11/2016 | Mount et al. |
| 9,665,832 B2 | 5/2017 | Thieberger et al. |
| 9,681,250 B2 | 6/2017 | Luo et al. |
| 9,706,292 B2 | 7/2017 | Duraiswami et al. |
| 9,818,228 B2 | 11/2017 | Lanier et al. |
| 9,843,883 B1 | 12/2017 | Su |
| 9,886,954 B1 | 2/2018 | Meacham et al. |
| 9,942,687 B1 | 4/2018 | Chemistruck et al. |
| 9,959,682 B2 | 5/2018 | Boyle et al. |
| 9,984,682 B1 | 5/2018 | Tao et al. |
| 10,013,654 B1 | 7/2018 | Levy et al. |
| 10,031,718 B2 | 7/2018 | Dack et al. |
| 10,038,967 B2 | 7/2018 | Jot et al. |
| 10,042,604 B2 | 8/2018 | Fallon |
| 10,057,708 B2 | 8/2018 | Robinson et al. |
| 10,068,376 B2 | 9/2018 | Smith et al. |
| 10,068,557 B1 | 9/2018 | Engel et al. |
| 10,089,578 B2 | 10/2018 | Jehan et al. |
| 10,127,723 B2 | 11/2018 | Miller |
| 10,129,664 B2 | 11/2018 | Fitz et al. |
| 10,154,360 B2 | 12/2018 | Lovitt |
| 10,169,921 B2 | 1/2019 | Jayaraj et al. |
| 10,176,635 B2 | 1/2019 | Teegan |
| 10,186,085 B2 | 1/2019 | Greco et al. |
| 10,206,055 B1 | 2/2019 | Mindlin et al. |
| 10,223,934 B2 | 3/2019 | Paul |
| 10,225,682 B1 * | 3/2019 | Lee .............. G06F 16/636 |
| 10,234,848 B2 | 3/2019 | Mehr et al. |
| 10,235,128 B2 | 3/2019 | Vaughn et al. |
| 10,248,744 B2 | 4/2019 | Schissler et al. |
| 10,255,285 B2 | 4/2019 | Sabin |
| 10,255,550 B1 | 4/2019 | Simkoff et al. |
| 10,255,897 B2 | 4/2019 | Woelfl |
| 10,262,462 B2 | 4/2019 | Miller |
| 10,276,143 B2 | 4/2019 | Prasad et al. |
| 10,721,521 B1 * | 7/2020 | Robinson .......... H04N 21/4394 |
| 2003/0007648 A1 | 1/2003 | Currell |
| 2004/0003042 A1 | 1/2004 | Horvitz et al. |
| 2004/0249776 A1 | 12/2004 | Horvitz et al. |
| 2006/0122834 A1 | 6/2006 | Bennett |
| 2006/0206221 A1 | 9/2006 | Metcalf |
| 2008/0137870 A1 | 6/2008 | Nicol et al. |
| 2008/0243278 A1 | 10/2008 | Dalton et al. |
| 2008/0306720 A1 | 12/2008 | Nicol et al. |
| 2009/0138415 A1 | 5/2009 | Lancaster |
| 2009/0202082 A1 | 8/2009 | Bharitkar et al. |
| 2009/0262946 A1 | 10/2009 | Dunko |
| 2010/0025483 A1 | 2/2010 | Hoeynck et al. |
| 2012/0116186 A1 | 5/2012 | Shrivastav et al. |
| 2012/0201405 A1 | 8/2012 | Slamka et al. |
| 2012/0288114 A1 | 11/2012 | Duraiswami et al. |
| 2012/0290515 A1 | 11/2012 | Frank et al. |
| 2013/0044129 A1 | 2/2013 | Latta et al. |
| 2013/0120365 A1 | 5/2013 | Lee et al. |
| 2013/0155105 A1 | 6/2013 | Boldyrev et al. |
| 2013/0174213 A1 | 7/2013 | Liu et al. |
| 2013/0236040 A1 | 9/2013 | Crawford et al. |
| 2013/0272527 A1 | 10/2013 | Oomen et al. |
| 2013/0278633 A1 | 10/2013 | Ahn et al. |
| 2013/0286004 A1 | 10/2013 | Mcculloch et al. |
| 2013/0290876 A1 | 10/2013 | Anderson et al. |
| 2013/0321390 A1 | 12/2013 | Latta et al. |
| 2014/0002492 A1 | 1/2014 | Lamb et al. |
| 2014/0046879 A1 | 2/2014 | Maclennan et al. |
| 2014/0067391 A1 | 3/2014 | Ganapathiraju et al. |
| 2014/0122391 A1 | 5/2014 | Mugan et al. |
| 2014/0161268 A1 | 6/2014 | Antani et al. |
| 2014/0200872 A1 | 7/2014 | Fang et al. |
| 2014/0240351 A1 | 8/2014 | Scavezze et al. |
| 2014/0253589 A1 | 9/2014 | Tout et al. |
| 2014/0272883 A1 | 9/2014 | Pardo et al. |
| 2014/0285519 A1 | 9/2014 | Uusitalo et al. |
| 2015/0148953 A1 | 5/2015 | Laurent et al. |
| 2015/0178865 A1 | 6/2015 | Anderson et al. |
| 2015/0242036 A1 | 8/2015 | Heidari et al. |
| 2015/0245139 A1 | 8/2015 | Park |
| 2015/0260474 A1 | 9/2015 | Rublowsky et al. |
| 2015/0282766 A1 | 10/2015 | Cole et al. |
| 2016/0086087 A1 | 3/2016 | Ghouti |
| 2016/0088417 A1 | 3/2016 | Kim et al. |
| 2016/0104452 A1 | 4/2016 | Guan et al. |
| 2016/0214011 A1 | 7/2016 | Weising et al. |
| 2016/0223218 A1 | 8/2016 | Barrett |
| 2016/0269712 A1 | 9/2016 | Ostrover et al. |
| 2016/0337779 A1 | 11/2016 | Davidson et al. |
| 2016/0379408 A1 | 12/2016 | Wright et al. |
| 2017/0032244 A1 | 2/2017 | Kurata |
| 2017/0038829 A1 | 2/2017 | Lanier et al. |
| 2017/0039986 A1 | 2/2017 | Lanier et al. |
| 2017/0061693 A1 | 3/2017 | Kohler et al. |
| 2017/0068782 A1 | 3/2017 | Pillai et al. |
| 2017/0094440 A1 | 3/2017 | Brown et al. |
| 2017/0098453 A1 | 4/2017 | Wright et al. |
| 2017/0103420 A1 | 4/2017 | Ramasarma |
| 2017/0103582 A1 | 4/2017 | Novak et al. |
| 2017/0124487 A1 | 5/2017 | Szeto et al. |
| 2017/0148433 A1 | 5/2017 | Catanzaro et al. |
| 2017/0153866 A1 | 6/2017 | Grinberg et al. |
| 2017/0173466 A1 | 6/2017 | Fahmie |
| 2017/0208415 A1 | 7/2017 | Ojala |
| 2017/0213551 A1 | 7/2017 | Ji et al. |
| 2017/0223478 A1 | 8/2017 | Jot et al. |
| 2017/0228916 A1 | 8/2017 | Patrick et al. |
| 2017/0236332 A1 | 8/2017 | Kipman et al. |
| 2017/0243113 A1 | 8/2017 | Fukuda et al. |
| 2017/0287221 A1 | 10/2017 | Ghaly et al. |
| 2017/0301140 A1 | 10/2017 | Smith et al. |
| 2017/0307435 A1 | 10/2017 | Park |
| 2017/0308808 A1 | 10/2017 | Kobylkin |
| 2017/0311095 A1 | 10/2017 | Fitz et al. |
| 2017/0336863 A1 | 11/2017 | Tilton et al. |
| 2017/0345219 A1 | 11/2017 | Holz |
| 2018/0003588 A1 | 1/2018 | Iwanami |
| 2018/0004481 A1 | 1/2018 | Fallon |
| 2018/0020312 A1 | 1/2018 | Visser et al. |
| 2018/0035234 A1 | 2/2018 | Roach et al. |
| 2018/0061132 A1 | 3/2018 | Lanier et al. |
| 2018/0061136 A1 | 3/2018 | Lehtiniemi et al. |
| 2018/0075657 A1 | 3/2018 | Lanier et al. |
| 2018/0077513 A1 | 3/2018 | Link |
| 2018/0082172 A1 | 3/2018 | Patel et al. |
| 2018/0082673 A1 | 3/2018 | Tzanetos |
| 2018/0089349 A1 | 3/2018 | Rezgui |
| 2018/0090152 A1 | 3/2018 | Ichimura |
| 2018/0101990 A1 | 4/2018 | Yang et al. |
| 2018/0108440 A1 | 4/2018 | Stevens et al. |

(56) References Cited

U.S. PATENT DOCUMENTS

| | | |
|---|---|---|
| 2018/0109899 A1 | 4/2018 | Arana |
| 2018/0124543 A1 | 5/2018 | Leppänen et al. |
| 2018/0150738 A1 | 5/2018 | Harvey |
| 2018/0151177 A1 | 5/2018 | Gemmeke et al. |
| 2018/0152487 A1 | 5/2018 | Griffin et al. |
| 2018/0160251 A1 | 6/2018 | Sanger et al. |
| 2018/0160984 A1 | 6/2018 | Mauger et al. |
| 2018/0174658 A1 | 6/2018 | Kikuchi |
| 2018/0177461 A1 | 6/2018 | Bell et al. |
| 2018/0192227 A1 | 7/2018 | Woelfl |
| 2018/0195752 A1 | 7/2018 | Sasaki et al. |
| 2018/0204116 A1 | 7/2018 | Evans et al. |
| 2018/0206057 A1 | 7/2018 | Kim et al. |
| 2018/0232471 A1* | 8/2018 | Schissler ............ G06F 18/2413 |
| 2018/0232662 A1 | 8/2018 | Solomon et al. |
| 2018/0232937 A1 | 8/2018 | Moyer et al. |
| 2018/0239144 A1 | 8/2018 | Woods et al. |
| 2018/0246698 A1 | 8/2018 | Huang |
| 2018/0249276 A1 | 8/2018 | Godfrey |
| 2018/0249279 A1 | 8/2018 | Karapetyan et al. |
| 2018/0255417 A1 | 9/2018 | Bosnjak et al. |
| 2018/0256962 A1 | 9/2018 | Kudirka et al. |
| 2018/0257658 A1 | 9/2018 | Cho et al. |
| 2018/0259978 A1 | 9/2018 | Dweik |
| 2018/0260502 A1 | 9/2018 | Dweik et al. |
| 2018/0260503 A1 | 9/2018 | Dweik et al. |
| 2018/0260680 A1 | 9/2018 | Finkelstein et al. |
| 2018/0261010 A1 | 9/2018 | Kudirka et al. |
| 2018/0284882 A1 | 10/2018 | Shipes et al. |
| 2018/0286134 A1 | 10/2018 | Warhol |
| 2018/0288161 A1 | 10/2018 | Saxena et al. |
| 2018/0293802 A1 | 10/2018 | Hendricks et al. |
| 2018/0293988 A1 | 10/2018 | Huang et al. |
| 2018/0306609 A1 | 10/2018 | Agarwal et al. |
| 2018/0308013 A1 | 10/2018 | O'Shea |
| 2018/0314486 A1 | 11/2018 | Edry et al. |
| 2018/0321737 A1 | 11/2018 | Pahud et al. |
| 2018/0328751 A1 | 11/2018 | Bejot et al. |
| 2018/0336476 A1 | 11/2018 | Fujimaki et al. |
| 2018/0349088 A1 | 12/2018 | Leppänen et al. |
| 2018/0350145 A1 | 12/2018 | Byl et al. |
| 2018/0352360 A1 | 12/2018 | Chen et al. |
| 2018/0359592 A1 | 12/2018 | Laaksonen et al. |
| 2018/0365898 A1 | 12/2018 | Costa |
| 2018/0374268 A1 | 12/2018 | Niles |
| 2019/0005947 A1 | 1/2019 | Kim et al. |
| 2019/0007726 A1 | 1/2019 | Anderson |
| 2019/0017374 A1 | 1/2019 | Misra et al. |
| 2019/0019011 A1 | 1/2019 | Ross et al. |
| 2019/0026403 A1 | 1/2019 | De Keyser et al. |
| 2019/0028484 A1 | 1/2019 | Truong |
| 2019/0043262 A1 | 2/2019 | Anderson et al. |
| 2019/0058961 A1 | 2/2019 | Lee |
| 2019/0060741 A1 | 2/2019 | Contreras |
| 2019/0073370 A1 | 3/2019 | Woodall et al. |
| 2019/0094842 A1 | 3/2019 | Lee et al. |
| 2019/0095451 A1 | 3/2019 | Lehtiniemi et al. |
| 2019/0096130 A1 | 3/2019 | Shim |
| 2019/0102946 A1 | 4/2019 | Spivack et al. |
| 2019/0103094 A1 | 4/2019 | Neil |
| 2019/0103848 A1 | 4/2019 | Shaya et al. |
| 2019/0116448 A1 | 4/2019 | Schmidt et al. |
| 2019/0129181 A1 | 5/2019 | Polcak et al. |
| 2019/0130644 A1 | 5/2019 | Mate et al. |
| 2019/0138207 A1 | 5/2019 | Eronen et al. |
| 2019/0166435 A1 | 5/2019 | Crow et al. |
| 2019/0166446 A1 | 5/2019 | Eronen et al. |
| 2019/0166448 A1 | 5/2019 | Laaksonen et al. |
| 2019/0215637 A1* | 7/2019 | Lee .......................... H04S 7/30 |
| 2019/0373395 A1* | 12/2019 | Sarkar ..................... H04S 7/304 |
| 2020/0128349 A1* | 4/2020 | Vilkamo ................ H04R 1/406 |
| 2022/0101623 A1* | 3/2022 | Walsh ..................... G06V 20/64 |
| 2022/0147563 A1* | 5/2022 | Perumalla ............. G06F 16/638 |
| 2022/0210588 A1* | 6/2022 | Chen ......................... G06T 7/70 |
| 2022/0327316 A1* | 10/2022 | Grauman ............. G06N 3/0464 |
| 2023/0104111 A1* | 4/2023 | Murgai ................... H04S 7/304 |
| | | 381/303 |

OTHER PUBLICATIONS

Genovese, A.F., et at., "Blind Room Volume Estimation from Single-channel Noisy Speech", ICASSP 2019—2019 IEEE International Conference on Acoustics, Speech and Signal Processing (ICASSP), pp. 1-5 (2019).

Lin, C., et al.. "Floorplan-jigsaw: Jointly estimating scene layout and aligning partial scans." In Proceedings of the IEEE/CVF International Conference on Computer Vision, pp. 5674-5683 (2019).

Poupyrev, I., et al., "Integrating Real and Virtual Worlds in Shared Space", In Proceedings of the 5th International Symposium on Artificial Life and Robotics, pp. 22-25 (2000).

"XAUDIO2FX_REVERB_I3DL2_PARAMETERS structure (xaudio2fx.h)", website: https://docs.microsoft.com/en-us/windows/win32/api/xaudio2fx/ns-xaudio2fx-xaudio2fx_reverb_i3dl2_parameters (2021).

Office Action in counterpart European Application No. 19 839 195.5-1207, mailed Jul. 13, 2022, 5 pages.

Search report and Written Opinion in corresponding International Patent Application No. PCT/2019/066315, mailed Mar. 12, 2020.

* cited by examiner

| Detail Level | Acoustic Room Classification | Mesh Builder / Material Classifier | Actual Reverb/ERE Control Params |
|---|---|---|---|
| General Acoustic Preset | Base Type: (Bathroom, Kitchen, Livingroom, outdoors) | | Tuned reverb preset + default reflection pattern consisting; frequency dependent RT60 time, reference room size (default reflection delays and onset times), room EQ/levels, default diffusion levels.<br><br>The preset/type may also be assigned a set of default materials. E.g. tile for bathrooms, drywall for bedroom walls and ceilings. These can allow even generic presets to have more realistic early reflections – especially if headtracking is involved. |
| | Softmax or Confidence | | Wet/Dry Mix (applied effect strength) or optionally, to linearly fade between a default neutral preset and one with the defining characteristics of the space.<br>Also used as described in the state flow to decide when to change presets. |
| Secondary Acoustic Modifier | General Size ("large living room" vs "Small living room") | Specific Room Dimensions | Scales the reference room size of the preset which can modify reflection delays and onset times changing the sense of space. Can also be used to modify RT60 times based on adjusted volume. |
| | Absorption Descriptors (Hard Surface vs Curtains, enclosed walls vs. ported/adjoining room) | Specific Materials | Adjustment to reflection absorption coefficient and RT60 times. |
| | Diffusion Descriptors (Parallel vs. Skewed Walls, cathedral vs flat ceiling, solid wall vs ported wall) | (Same, but would likely just jump to ERE Details below) | Engage/disengage an ERE diffusion filter. Scale FDN density control of the FDN reverb. Increase order of FDN. Modify wet/dry mix or levels. |
| Early Reflection Detail | | Specific geometry or materials of the space coupled with positional tracking data | Reverb times updated for specific Sabine behaviors based on ratio of materials and room dimensions.<br>Apply specific environment-accurate reflections based on position. (reflection delay, EQ, and direction) |

FIG. 15 om ACOUSTICS SIMULATION USING
DEEP LEARNING IMAGE ANALYSIS

PRIORITY CLAIM

This application is a continuation of International Application No. PCT/US2019/066315, filed on Dec. 13, 2019, which claims the benefit of U.S. provisional patent application No. 62/784,648, filed Dec. 24, 2018, the entireties of which are incorporated herein by reference.

TECHNICAL FIELD

The present disclosure relates to classifying images for augmented reality.

BACKGROUND

Augmented Reality (AR) is the merging of real and virtual worlds to produce new environments and visualizations where actual or real physical objects and digital or virtual objects co-exist and may interact in real time. AR brings a virtual world into a real-world environment of a user with true-to-life visuals and audio. AR mixes virtual sounds from virtual sound objects with real sounds in a real acoustic environment. Virtual sound from a virtual sound object should match equivalent real-world sound as played through headphones to a user to ensure a pleasing AR experience. Otherwise, the user experiences a degradation of the AR experience. Conventional techniques use complex multistep processes to match the virtual sound to the equivalent real-world sound. Such complexity introduces noticeable aural delays into an AR simulation, which may degrade the user experience. Moreover, the complexity disadvantageously increases processing requirements for, and thus the cost of, AR devices.

BRIEF DESCRIPTION OF THE DRAWINGS

FIG. 15 is a table of example acoustic parameters generated by the XR processor of FIG. 12.

DESCRIPTION OF EXAMPLE EMBODIMENTS

Example Embodiments

Figure 1A:
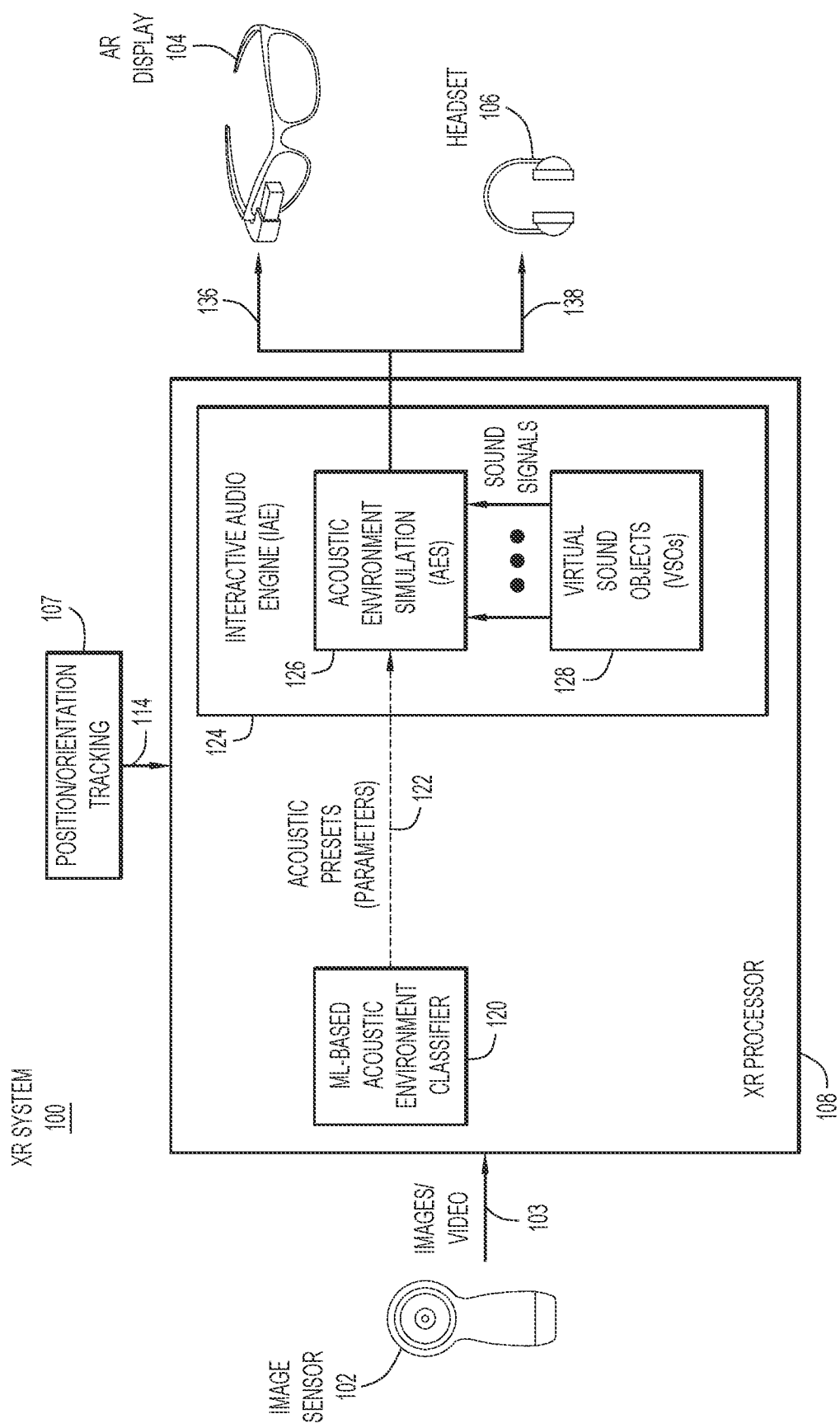
FIG. 1A is a high-level block diagram of an example extended reality (XR) system configured to provide an AR experience to a user.

Extended reality (XR) generally encompass virtual reality (VR) and augmented reality (AR), sometimes referred to as mixed reality (MR). Audio signal reproduction systems have evolved to deliver three-dimensional (3D) audio to a listener. In 3D audio, sounds are produced by headphones or earphones (for simplicity, collectively referred to herein as "headphones") and can involve or include virtual placement of a sound source in a real or theoretical 3D space or environment auditorily perceived by the listener. For example, virtualized sounds can be provided above, below, or even behind a listener who hears 3D audio-processed sounds. Conventional audio reproduction via headphones tends to provide sounds that are perceived as originating or emanating from inside the head of the listener. In an example, audio signals delivered by headphones, including using a conventional stereo pair of headphones, can be specially processed to achieve 3D audio effects, such as to provide the listener with a perceived spatial sound environment.

A 3D audio headphone system can be used for VR applications, such as to provide the listener with a perception of a sound source at a particular position in a local or virtual environment where no real sound source exists. Similarly, a 3D audio headphone system can be used for AR applications, to provide the listener with the perception of the sound source at the position where no real sound source exists, and yet in a manner that the listener remains at least partially aware of one or more real sounds in the local environment. Computer-generated audio rendering for VR or AR can leverage signal processing technology developments in gaming and virtual reality audio rendering systems and application programming interfaces, such as building upon and extending from prior developments in the fields of computer music and architectural acoustics. Various binaural techniques, artificial reverberation, physical room acoustic modeling, and auralization techniques can be applied to provide users with enhanced listening experiences. A VR or AR signal processing system can be configured to reproduce some sounds such that they are perceived by a listener to be emanating from an external source in a local environment rather than from headphones or from a location inside the head of the listener.

Compared to VR 3D audio, AR audio involves the additional challenge of encouraging suspension of a participant's disbelief, such as by providing simulated environment acoustics and source-environment interactions that are substantially consistent with acoustics of a local listening environment. This presents a challenge of providing audio signal processing for virtual or added signals in such a manner that the signals include or represent the environment of the user, and such that the signals are not readily discriminable from other sounds naturally occurring or reproduced over headphones in the environment. Such audio signal processing provides accurate sound sources in a virtual sound field by matching and applying reverberation properties, including decay times, reverberation loudness characteristics, and/or reverberation equalization characteristics (e.g., spectral content of the reverberation) for a given listening environment. In audio-visual AR applications, computer-generated sound objects (referred to as "virtual sound objects") can be rendered via acoustically transparent headphones to blend with a physical environment heard naturally by the viewer/listener. Such blending can include or use binaural artificial reverberation processing to match or approximate local environment acoustics.

Embodiments presented herein provide a practical and efficient approach to extend 3D audio rendering algorithms or simulations to faithfully match, or approximate, physical local environment acoustics. The embodiments provide solutions to the above-mentioned problems and/or challenges, and also provide advantages that will become apparent from the ensuing description. The embodiments may be used in 3D audio applications, such as VR and AR, for example. The embodiments use machine learning (ML) techniques to predict acoustic properties of the local environment, such as reverberation characteristics, directly from images of the local environment captured by an image sensor. The embodiments may then use the predicted acoustic properties in an acoustic simulation of the environment that matches or approximates actual acoustics of the local environment. Based on the predicted acoustic properties, the acoustic environment simulation seamlessly blends virtual sound with the local environment, when perceived by a listener via headphones.

More specifically, embodiments presented herein use ML techniques to train one or more neural networks of an ML classifier to predict the acoustic properties of an unknown environment accurately using an image sensor. The predicted acoustic properties are then used to create an acoustic context for virtual sound objects in the form of an acoustic environment simulation created within that environment in real-time. The embodiments advantageously: make use of camera sensors that are generally available on an XR device; allow the use of typical audio plugins used in machine learning engines, such as Unity and Unreal engines; reduce complexity, processing requirements, and delay associated with matching virtual sound to an equivalent real-world sound in real-time AR environments compared to conventional techniques; provide scalable implementations depending on image sensor availability; and may be implemented as a deep learning inference engine.

System-Level Description

At a high-level, embodiments presented herein employ ML techniques to classify images of a real-world (i.e., an actual) environment directly to an acoustic preset that represents a set of acoustic parameters for an acoustic environment simulation (AES). The set of acoustic parameters represent a set of properties sufficient to perform the AES. The AES simulates or models a sound response of the real-world environment based on the set of acoustic parameters of the acoustic preset. The acoustic preset is a parametric representation of the sound response. The AES applies the sound response to sound from virtual sound objects placed (virtually) in the real-world environment, to convert the sound to realistic sound that appears to originate, realistically, from the virtual sound objects when played to a user through headphones. The aforementioned real-world environment includes any real-world environment or space with reverberant qualities, such as, but not limited to, a room, auditorium, concert hall, outdoor theatre, and so on. The rooms may also include rooms in a home, such a kitchen, a living room, a dining room, a bathroom, and so on. The rooms may also include office spaces, and the like.

With reference to FIG. 1A, there is a high-level block diagram of an example XR system 100 configured to provide an AR experience to a user according to embodiments presented herein. Although the embodiments are described primarily in the context of AR applications, the embodiments apply equally to VR applications. In FIG. 1A, dashed-lines generally represent parametric flow, e.g., flows of acoustic parameters, while solid-lines generally represent image and sound signal flow.

XR system 100 includes an image sensor 102 to capture a sequence of images or video (collectively, "images") 103, an AR display 104, a headset 106 including left and right headphones, an optional position sensor 107, and an XR processor or processor 108 coupled to, and that communicates with, the image sensor, the AR display, the headset, and the position sensor. XR processor 108 includes (i) an ML-based acoustic environment classifier 120 (referred to simply as an "ML classifier" 120) that includes one or more neural networks to classify images 103 into acoustic presets 122 according to embodiments presented herein, and an interactive audio engine (IAE) 124. IAE 124 may be implemented as part of XR processor 108 as shown in FIG. 1A, or may be separate from the XR processor. In an example, ML classifier 120 may include one or more convolutional neural networks (CNNs), such as AlexNet, GoogLeNet, and ResNet50. In other examples, ML classifier 120 includes non-CNN neural networks suitable for classifying images as descried herein. IAE 124 generates or performs an AES 126 based on acoustic presets 122 from ML classifier 120, and also generates one or more virtual sound objects 128 for virtual placement into scenes of a real-world environment.

Image sensor 102 may include a video camera to capture a sequence of images 103 of the real-world environment. Image sensor 102 may be positioned at different positions and orientations (collectively, "vantage points") in the real-world environment to capture images 103 of different scenes of the real-world environment from the different vantage points. For example, image sensor 102 may include a video camera that is worn by a user who is a target of an AR experience, such that video camera operates to capture different scenes of the real-world environment as the user moves around in the real-world environment. Position sensor 107 senses or determines a position and an orientation of one or more objects, including the user, in the environment, and provides position information 114 indicative of the position and the orientation of the objects to XR processor 108.

At a high-level, in operation, XR processor 108 processes (i) images 103 of the real-world environment, (ii) sound (i.e., sound signals) from virtual sound objects 128, and (iii) position information 114, when available, to produce a video signal 136 and a sound signal 138 representative scenes of the real-world environment augmented with the virtual sound objects and other virtual information. AR display 104 converts video signal 136 to video and plays the video to the user. The headphones of headset 106 convert sound signal 138 to sound and play the sound to the user. More specifically, ML classifier 120 of XR processor 108 employs deep learning neural network techniques to classify images 103 into acoustic presets 122. Each of acoustic presets 122 represents a respective set of acoustic parameters, such as reverberation ("reverb") parameters, that represent sound properties of the real-world environment. IAE 124 performs AES 126 based on acoustic presets 122, to simulate or model an acoustic response, including reverberation, for the real-world environment. IAE 124 also generates one or more virtual sound objects 128 placed at various virtual locations into scenes of the real-world environment. AES 126 applies the sound response to sound signals generated by virtual sound objects 128, to convert the sound signals from the virtual sound objects to sound signals 118 that convey realistic sound for the virtual sound objects. That is, AES 126 models at least sound reverberation, for example, for the virtual sound objects.

Figure 1B:
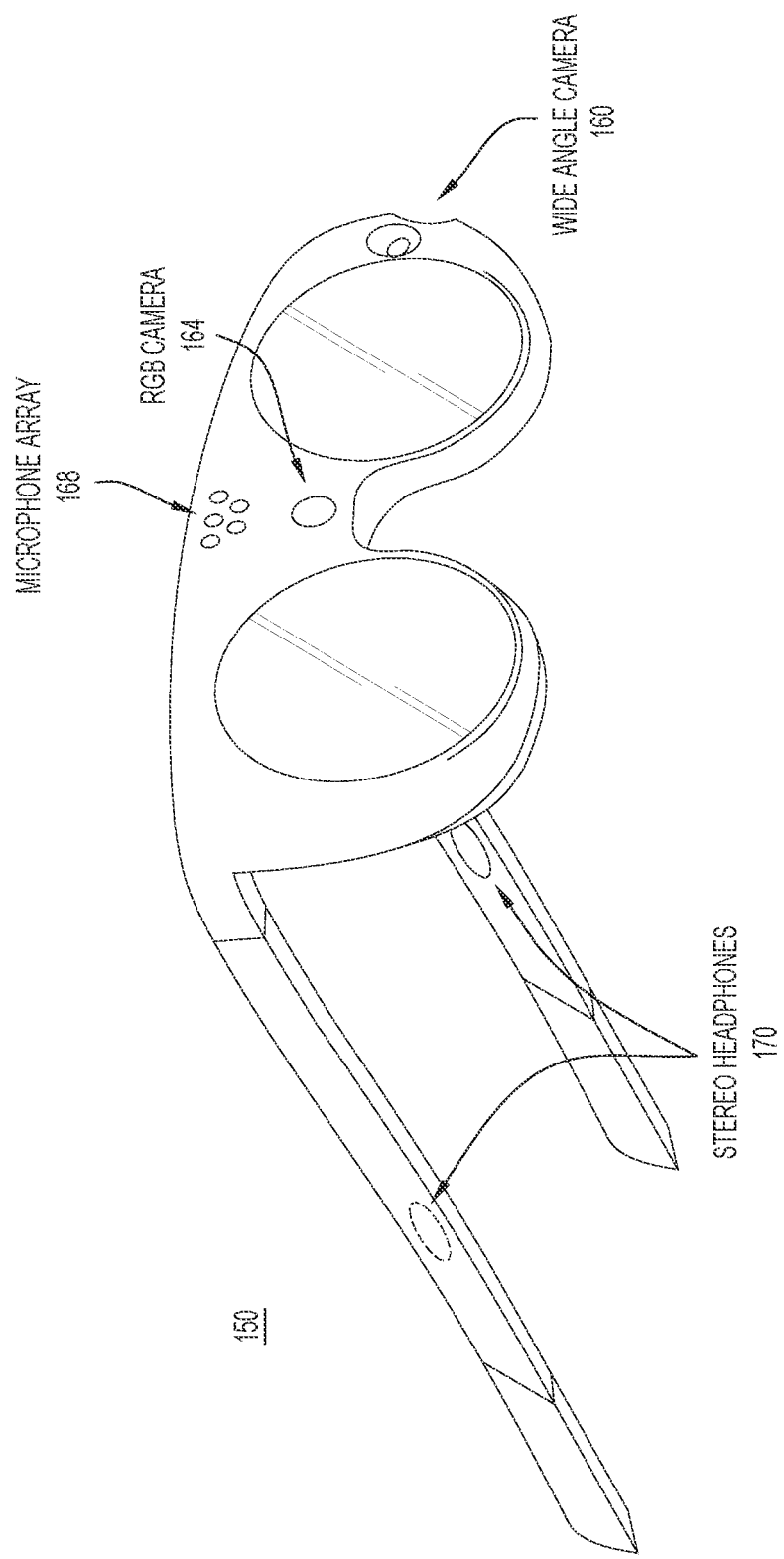
FIG. 1B is a perspective view of an example AR device or system that may be worn by a user and configured to convey an AR experience to the user.

With reference to FIG. 1B, there is a perspective view of an AR device 150 that may be worn by a user and used to convey an AR experience to the user. Device 150 includes a wide angle tracking camera 160, a red, green, blue (RGB) camera 164, a microphone array 168, and stereo headphones 170 all coupled to a built-in XR processor, not shown in FIG. 1B. AR device 150 may also include a time of flight depth sensor and additional stereoscopic cameras coupled to the XR processor.

Figure 2:
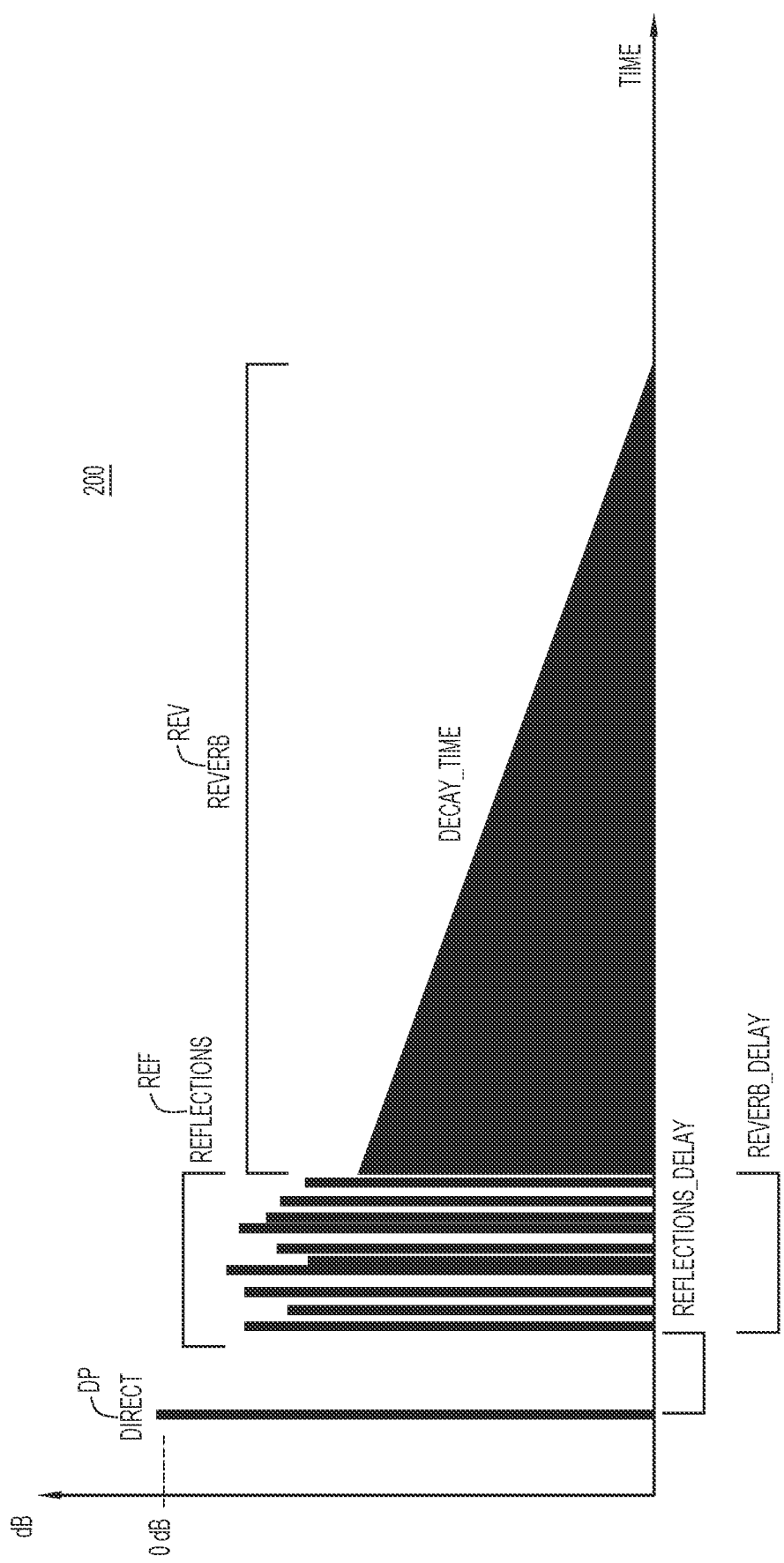
FIG. 2 is an illustration of an example sound response for an environment that may be simulated by the XR system based on acoustic presets.

With reference to FIG. 2 there is an illustration of a generic sound response 200 for a real-world environment that may be simulated by the AES based on acoustic presets 122. Sound response 200 occurs in response to a sound impulse that originates from a sound source in the real-world environment. Sound response 200 may be recorded at a listener position in the real-world environment that is spaced-apart from the sound source. Sound response 200 includes direct path (DP) sound, reflections (REF) including early reflections that follow the direct path sound, and reverberant energy or reverberations (REV) that follow the reflections. Reflections REF begin after a reflection delay from when the direct path sound DP occurs, and reverberations REV begin after a reverberation delay from when the reflections REF begin. The amplitude of reverberations REV decay according to a decay time of the reverberation. In the embodiments presented herein, AES 126 employs the acoustic parameters of acoustic presets 122 in addition to other acoustic parameters to simulate/represent direct path sound, early reflections, and reverberation with respect to sound from virtual sound objects 128.

Figure 3:
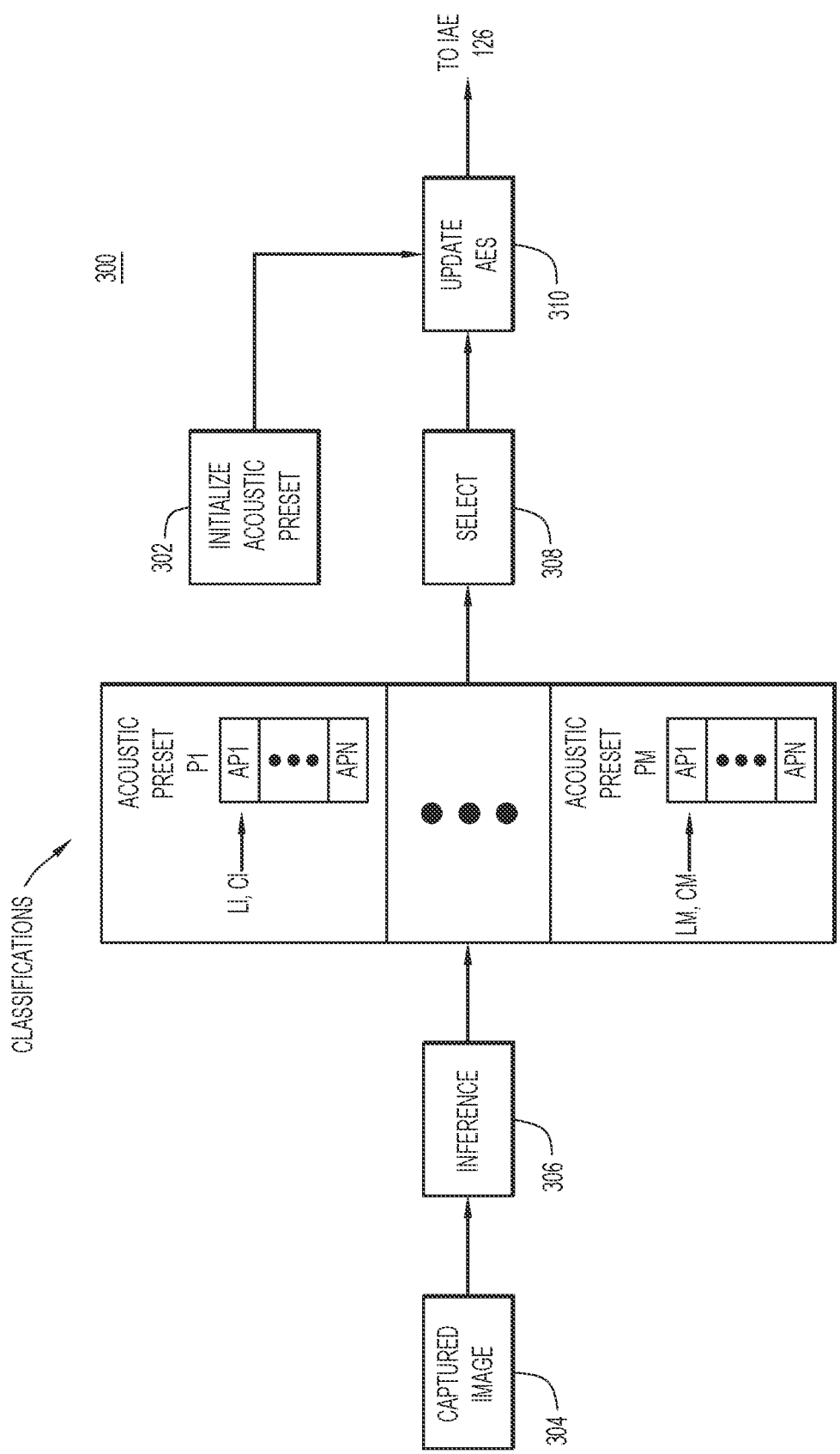
FIG. 3 is an illustration of an example method of machine learning (ML)-based classifying of images combined with rendering of sound from virtual sound objects, which may be performed by the XR system.

FIG. 3 is an illustration of an example method 300 of ML-based classifying of images 103 directly to acoustic presets 122, and rendering of sound from virtual sound objects 128, which may be performed by ML classifier 120 and IAE 124. Method 300 assumes that ML classifier 120 has already been trained in an a priori training operation to classify images to acoustic presets, directly. Briefly, the training includes training ML classifier 120 on different images labeled with different ones of the acoustic presets. In an example, the acoustic presets may include M, e.g., 10, 20, and so on, acoustic presets P1-PM associated with labels L1-LM, respectively. Each acoustic preset Pi represents a set of acoustic parameters AP1-APN used for an acoustic environment simulation, e.g., AES 126. Labels L1-LM and acoustic presets P1-PM (and their sets of associated acoustic parameters AP1-APN) may be stored in memory of XR processor 108. Acoustic parameters AP1-APN have respective values for a given acoustic preset Pi, and the values vary across acoustic presets P1-PM. Acoustic parameters AP1-APN may include at least acoustic reverberation parameters. Generally, reverberation parameters may include, reverberation decay times, reverberation loudness characteristics, and/or reverberation equalization characteristics (e.g., spectral content of the reverberation), for example. More specifically, the reverberation parameters may include, high frequency attenuation and decay time, low frequency attenuation and decay time, damping, diffusion, density, room size, and so on. The reverberation parameters may include parameters as defined in in any known or hereafter developed acoustic-related standard, such as the Interactive 3D Audio Rendering Guidelines Level 2.0 (I3DL2)

Acoustic parameters AP1-APN may include additional acoustic parameters, such as one or more sound reflection parameters/coefficients, one or more sound absorption parameters/coefficients, and so on.

At 302, XR processor 108 selects or establishes one of acoustic presets P1-PM as a default or initial acoustic preset for the AES. Acoustic parameters AP1-APN of the default acoustic preset represent initial acoustic parameters.

At 304, ML classifier 120 receives an image among the sequence images 103 captured by image sensor 102. In steady state operation, the image may be a current image among previous and future images among the sequence of images 103 to be processed sequentially through method 300.

At 306, referred to as "inference," (pre-trained) ML classifier 120 directly classifies the image into a set of multiple (current) classifications corresponding to acoustic presets P1-PM. The set of classifications may simply include labels L1-LM indicative of acoustic presets P1-PM with confidence levels C1-CN associated with respective ones of the labels. Labels L1-LM may be used to access respective ones of (known) acoustic presets P1-PM, and thus (known) acoustic parameters AP1-APN of the acoustic presets. For example, acoustic presets P1-PM may be stored so as to be indexed and thus retried based on labels L1-LM. Confidence level Ci represents a probability that the associated label Li/acoustic preset Pi is correct for the image, i.e., that the image was classified correctly to label Li/acoustic preset Pi. In this way, the classifications may be considered soft decisions, rather than hard decisions.

At 308, XR processor 108 selects the label/acoustic preset associated with the greatest confidence level among confidence levels C1-CN among the classifications, to produce a (current) selected label/acoustic preset. The selected acoustic preset replaces the default acoustic preset from operation 302. The selected acoustic preset is retrieved from memory (i.e., acoustic parameters AP1-APN of the selected preset are retrieved from memory).

At 310, XR processor 108 updates IAE 124 with the selected acoustic preset, i.e., with parameters AP1-APN of the selected acoustic preset.

Method 300 repeats sequentially as next images among the sequence of images 103 arrive for classification, to produce a sequence of classification results corresponding to the sequence of images, and that are sequentially passed to IAE 124 for AES 126.

A variation of method 300 conditions acoustic preset updates to IAE 124 on a predetermined confidence level threshold, which may introduce hysteresis into the updates provided to the IAE as the method repeats to classify successive images. More specifically, the variation only updates IAE 124 when one or more (current) classifications have confidence levels that exceed the confidence level threshold, in which case operations 308 and 310 proceed as described above. Otherwise, the variation does not update IAE 124, i.e., the variation simply maintains a last, previous update to the IAE that exceeded the confidence level threshold. Assuming the classifications include softmax values (i.e., soft decisions) that represent or are associated with confidence levels as probabilities, the confidence level threshold may be set equal to a probability of 0.7, for example. In that case, an update occurs only when the corresponding probability exceeds >0.7. To add hysteresis, the update may occur only when an average confidence level over a predetermined number>1 of consecutive classifications (through operation 306) exceeds 0.7.

Classification Flowcharts

Various methods of classifying images using ML techniques are now described in connection with flowcharts of FIGS. 4-7. The methods may be performed to classify the images to classifications indicative of acoustic presets P1-PM described above. The methods may be performed by XR system 100.

Figure 4:
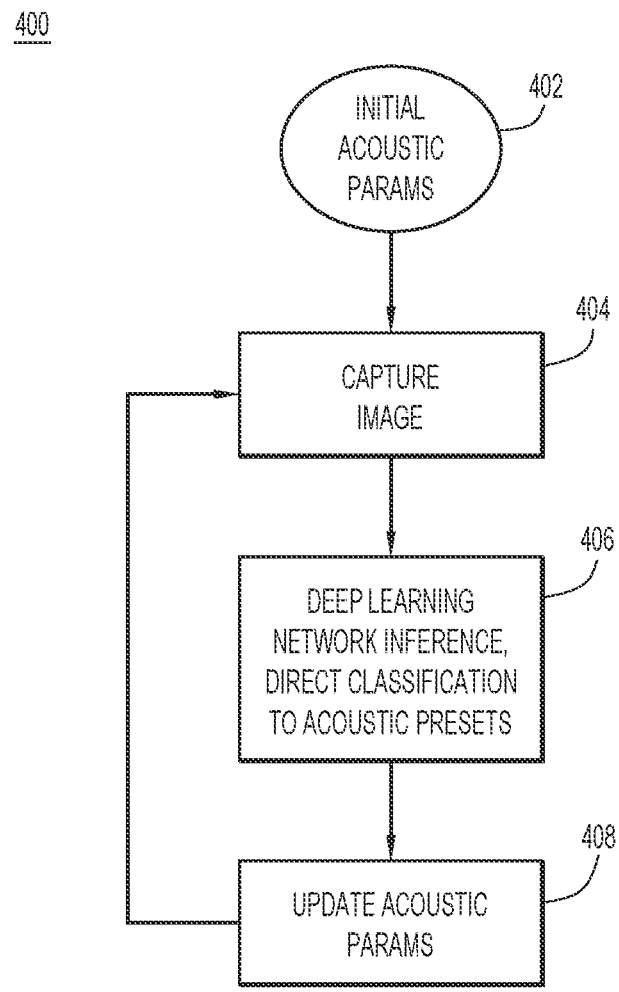
FIG. 4 is a flowchart of an example method of using ML classification to classify an image of a real-world environment directly to an acoustic preset of acoustic parameters for an acoustic environment simulation.

FIG. 4 is a flowchart of an example method 400 of using ML classification to classify an image of a real-world environment directly to a "best match" acoustic preset of acoustic parameters for an AES (e.g., AES 126). Method 400 summarizes operations described above in connection with method 300. Method 400 assumes an ML classifier (e.g., ML classifier 120) that was trained on many images of different real-world environments and that were labeled with various ones of acoustic presets P1-PM, so that the ML classifier is configured, as a result of the training, to classify an image directly to the acoustic presets (i.e., to the acoustic parameters of the acoustic presets), without intervening classifications or operations.

At 402, an initial acoustic preset among acoustic presets P1-PM is established.

At 404, an image of a scene of a real-world environment is captured.

At 406, using a deep learning neural network inference, the image (received from 404) is classified directly to M classifications indicative of acoustic presets P1-PM and their respective confidence levels C1-CN. The acoustic preset among acoustic presets P1-PM associated with the highest confidence level among confidence levels C1-CN is considered a "best match" acoustic preset to the real-world environment depicted in the image. That is, the simulated sound response generated by AES 126 based on the best match acoustic preset is closer to an actual sound response of the real-world environment than would be generated based on any of the other acoustic presets. At 408, the best match acoustic preset may be identified/selected based on the confidence levels associated with the classifications/acoustic presets.

At 408, it is determined whether to update AES 126 with the best match acoustic preset, as described above in connection with FIG. 3, for example. If it is determined to update AES 126, the best match acoustic preset is provided to the AES, and thus replaces the previous acoustic preset. Otherwise, AES 126 is not updated with the best match acoustic preset, and the AES uses a previous best match acoustic preset (i.e., the previous acoustic preset is not replaced).

From 408, flow control returns to 404 and the process repeats for a next image.

Figure 5:
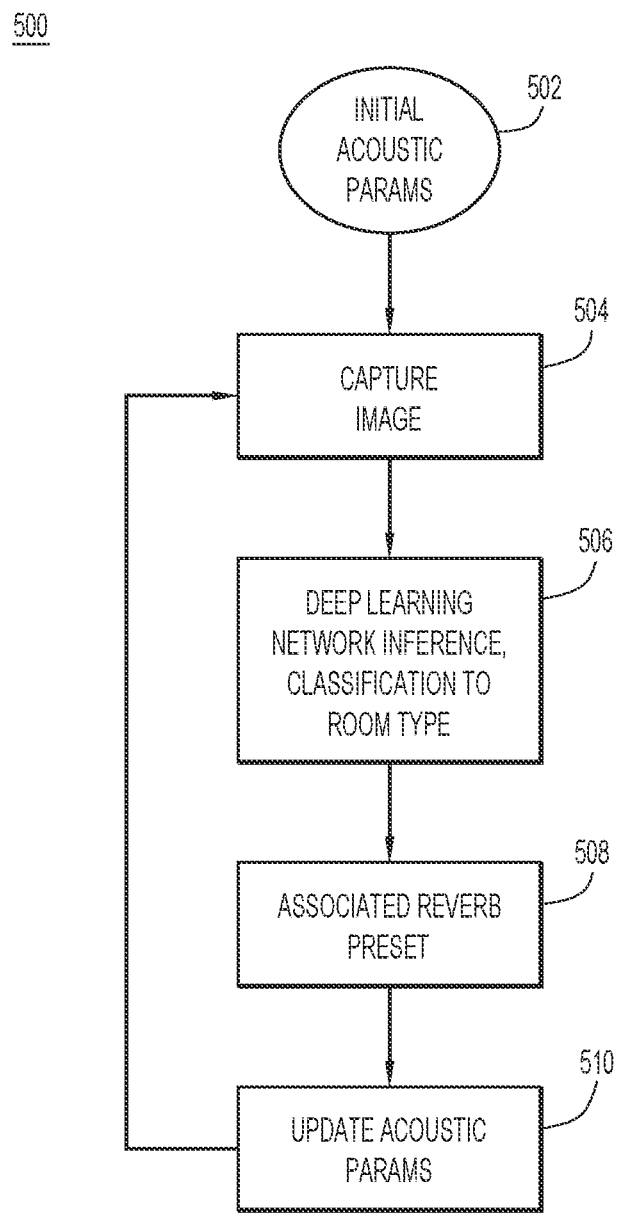
FIG. 5 is a flowchart of an example method of using ML classification to classify an image of a real-world environment to a room type, from which an acoustic preset for an acoustic environment simulation may then be derived.

FIG. 5 is a flowchart of an example method of using ML classification to classify an image of a real-world environment to a room type, from which an acoustic preset for an acoustic environment simulation may then be derived. Method 500 assumes an ML classifier that was trained on images of different real-world environments that were labeled with room types (e.g., kitchen, bathroom, living room, and so on), so that the ML classifier is configured, as a result of the training, to classify an image to a room type. Method 500 also assumes that respective ones of acoustic presets P1-PM may be assigned to, or derived from the room types resulting from the aforementioned classification.

At 502, an initial acoustic preset among acoustic presets P1-PM is established.

At 504, an image of a scene of a real-world environment is captured.

At 506, using a deep learning neural network inference, the image (received from operation 504) is classified to a room type, e.g., kitchen.

At 508, an acoustic preset among acoustic presets P1-PM associated with/assigned to the room type is retrieved.

At 510, the acoustic preset from 508 may be used to update the AES.

From 510, flow control returns to 504 and the process repeats for a next image.

In method 500, inference operation 506 does not classify directly to an acoustic preset. Therefore, an extra operation, 508, is used to identify the acoustic preset after the classification is performed. That is, the room type is translated to the acoustic preset.

Figure 6:
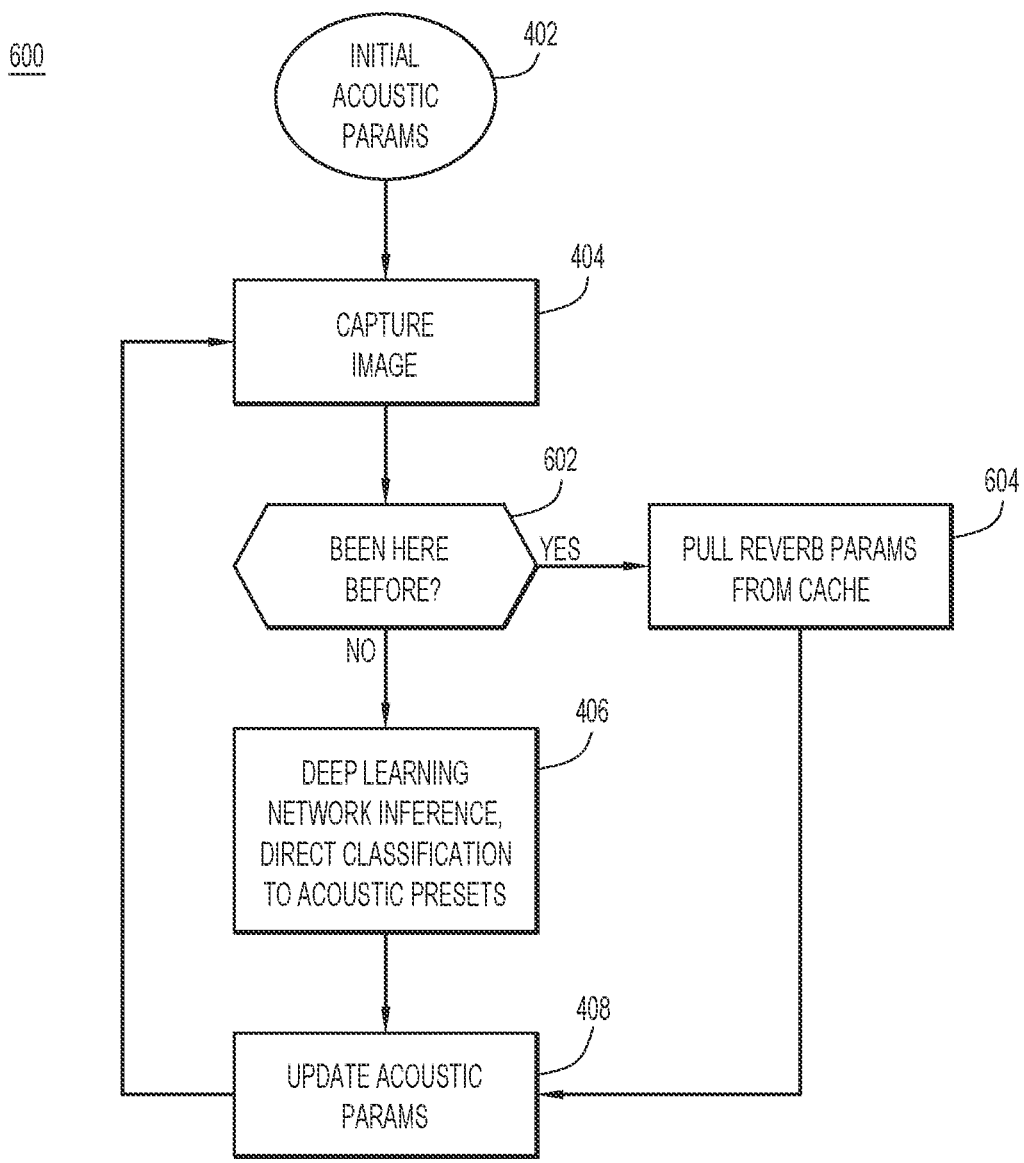
FIG. 6 is a flowchart of an example method of using ML classification to classify an image of a real-world environment directly to an acoustic preset of acoustic parameters for an acoustic environment simulation based on a cache of scenes of real-world environments and their associated acoustic presets.

FIG. 6 is a flowchart of an example method of using ML classification to classify an image of a real-world environment directly to an acoustic preset of acoustic parameters for AES 126 based on a cache of scenes of real-world environments and their associated acoustic presets. Method 600 is similar to method 400, except that method 600 includes additional operations 602 and 604, described below. Method 600 assumes that XR processor 108 determines which real-world environments, e.g., rooms, a user has been in, and records in a cache a (best) acoustic prefix for each of the rooms.

Flow proceeds from 402 and 404 to 602. At 602, it is determined whether the user has previously been in the room in which the user is currently positioned. If the user has been in the room previously, flow proceeds to 604, where the acoustic prefix for the room is retrieved from the cache. Flow proceeds from 604 to 408, which uses the acoustic prefix retrieved from the cache. If the user has not been in the room previously, flow proceeds to 406, and operation continues as described above. An example of an XR processor configured to perform method 600 is described below in connection with FIG. 16.

Figure 7:
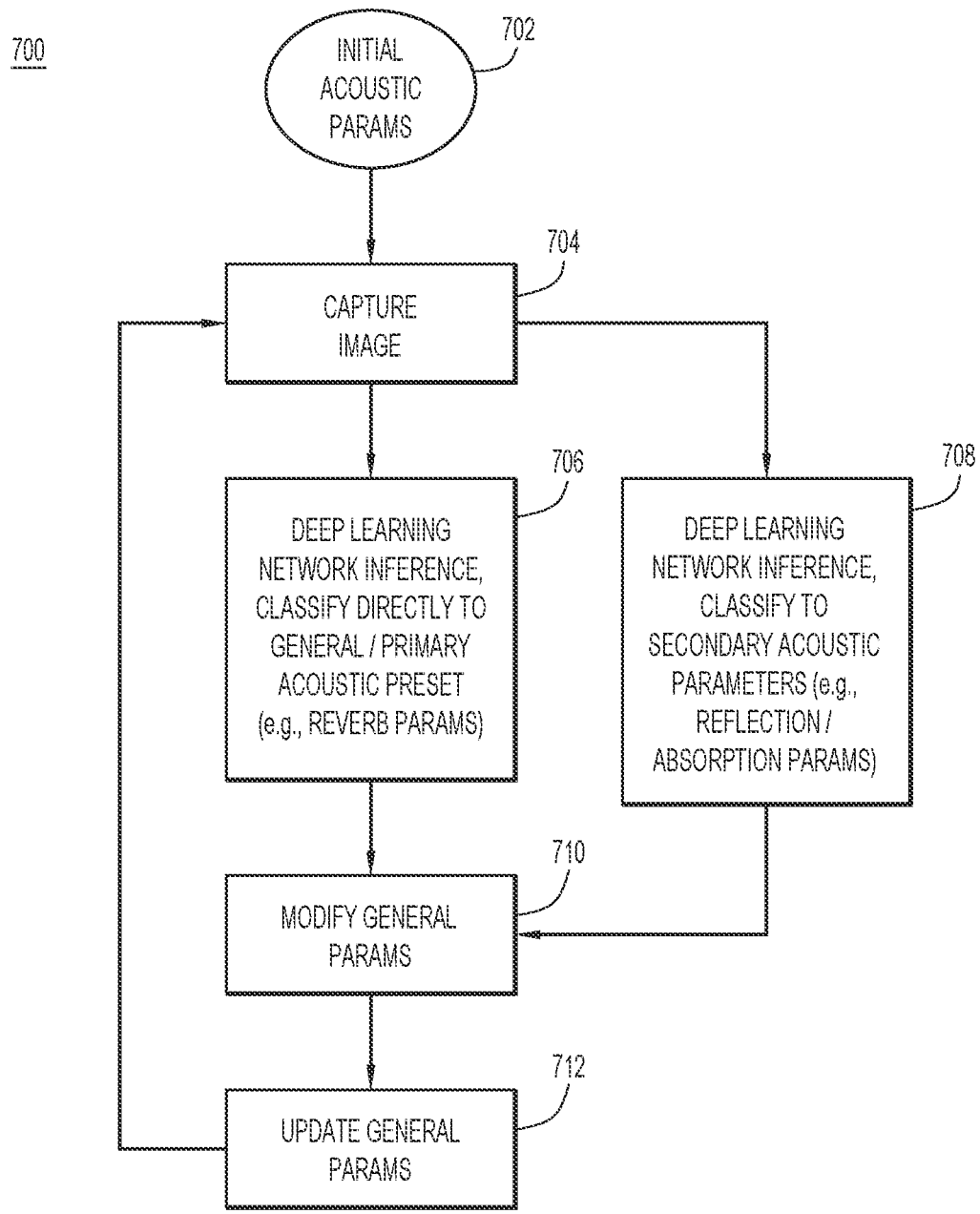
FIG. 7 is a flowchart of an example method of using ML classification to classify an image of a real-world environment directly to a general/primary acoustic preset and secondary acoustic modifiers for an acoustic environment simulation.

FIG. 7 is a flowchart of an example method of using ML classification to classify an image of a real-world environment directly to a general/primary acoustic preset and secondary acoustic modifiers for AES 126. More specifically, method 700 uses a first neural network of an ML classifier (e.g., ML classifier 120) trained to classify an image of a real-world environment directly to general acoustic presets (also referred to as "primary acoustic presets"), as in method 400. Each of the general acoustic presets includes a respective set of general acoustic parameters. For example, the general acoustic parameters may be reverberation parameters. Method 700 also uses a second neural network of the ML classifier trained to further classify the image to additional or secondary acoustic parameters, such as absorption and/or reflection parameters or coefficients, room volume, and so on, that may be used to modify the general acoustic presets.

At 702, At 702, an initial acoustic preset among acoustic presets P1-PM is established.

At 704, an image of a scene of a real-world environment is captured.

At 706, using the first neural network, the image is directly classified to the general acoustic presets, from which the best general acoustic preset is selected, i.e., the acoustic preset associated with the highest confidence level is selected as the best acoustic preset.

At 708, using the second neural network, the image is directly classified to the secondary acoustic parameters.

At 710, one or more of the general acoustic parameters of the general acoustic preset selected at 706 are modified/adjusted based on one or more of the secondary acoustic parameters, to produce a modified general acoustic preset. For example, values of the general acoustic parameters of the general acoustic preset may be increased or decreased based on values of the secondary acoustic parameters. Alternatively, one or more of the general acoustic parameters may be replaced by one or more of the secondary acoustic parameters.

In a simple example, an absorption coefficient $\alpha$ in a fractional range $0<\alpha<1$ may be used as a secondary acoustic parameter, in which case operation 710 may multiply one or more of the general acoustic parameters by the absorption coefficient $\alpha$, to produce one or more modified general acoustic parameters. In practice, such a modification based on absorption may be more complex for the following reason. Since each material has its own absorption coefficient, early reflections from the material are usually directly influenced by the absorption coefficient of the material. Thus, reverberation in an acoustic environment comprising many different materials can be influenced by an aggregate of the materials in the environment, which collectively produce an aggregate absorption. The aggregate absorption may affect the delay rate of the reverberation differently in different frequency bands, which can be taken into account at operation 710.

At 712, the modified general acoustic preset may be used to update the AES.

From 712, flow returns to 704, and the process repeats.

Figure 8:
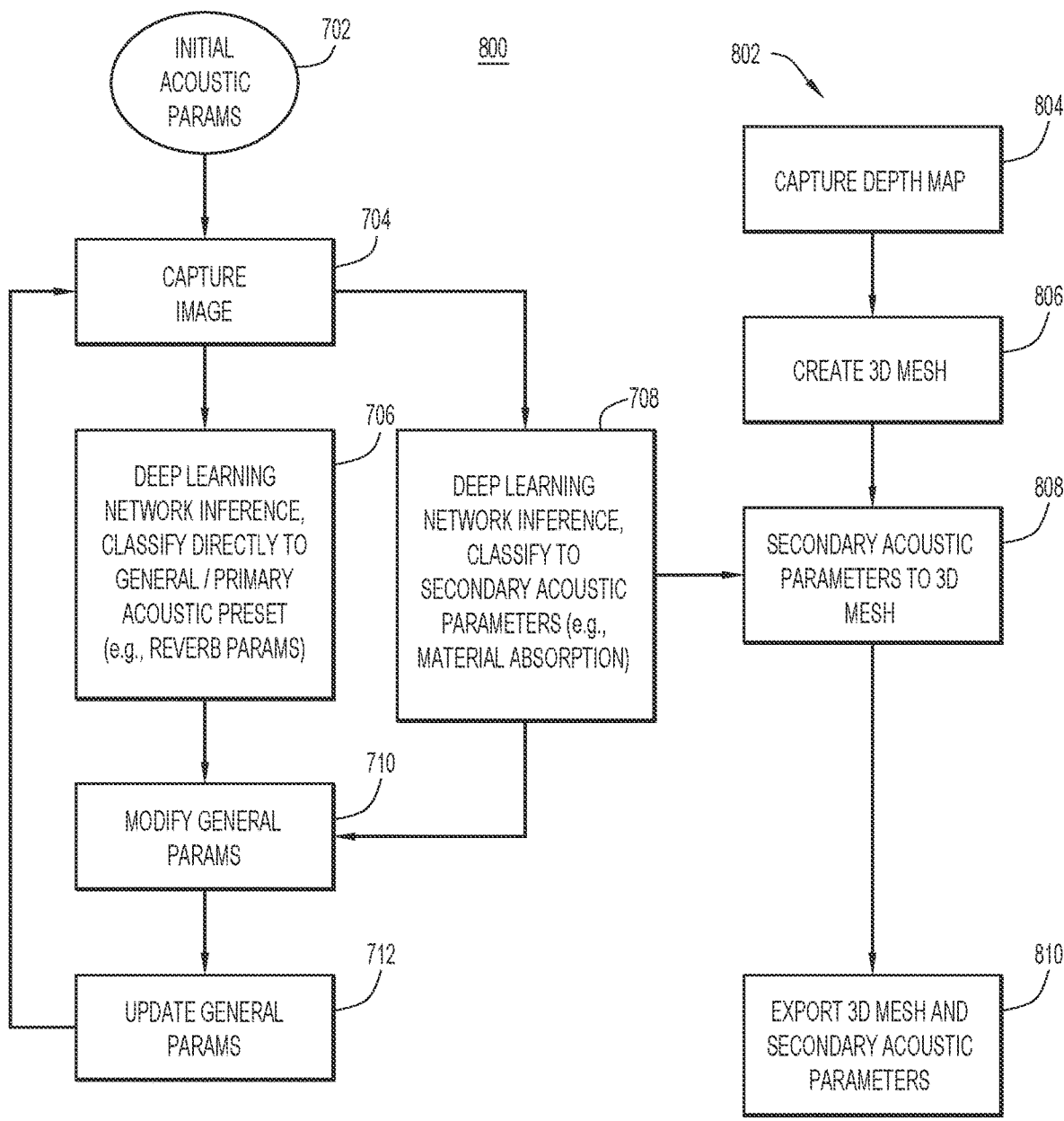
FIG. 8 is a flowchart of an example method that extends the method of FIG. 7 to generate a three-dimensional (3D) mesh and acoustic parameters derived from material properties of the 3D mesh.

With reference to FIG. 8, there is a flowchart of an example method 800 that is similar to method 700, except that method 800 includes 3D mesh processing operations 802 linked with operation 708 of method 700. Only 3D mesh processing operations 802 are described. Generally, 3D mesh processing operations 802 map one or more of the secondary acoustic parameters produced at operation 708 to components of 3D mesh generated using a depth camera, for example.

At 804, a depth camera captures a depth map (image) of the same real-world environment for which the image was captured at operation 704.

At 806, the 3D mesh is created from the depth map.

At 808, a secondary acoustic parameter (e.g., material sound absorption) produced at operation 708 is mapped to the 3D mesh.

At 810, the 3D mesh and the secondary acoustic parameter are exported.

Training and real-time operations of ML classifier 120 are now described in further detail in connection with FIGS. 9-11B.

ML Training

Figure 9A:
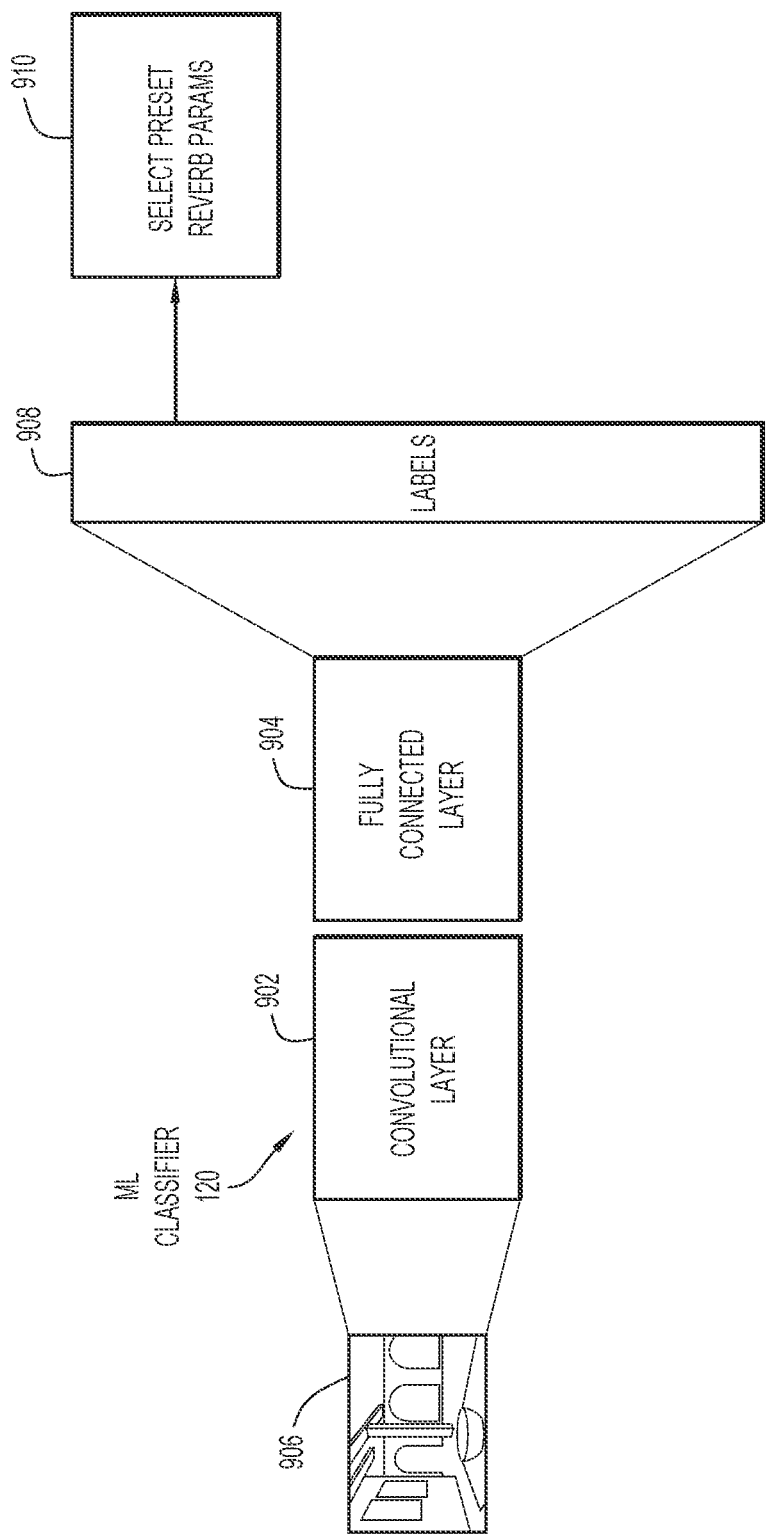
FIG. 9A is an illustration of an example method of training an ML classifier of the XR system based on training images according to a first training scenario, and using the ML classifier, once trained, to classify images.

FIG. 9A is an illustration of an example method of training ML classifier 120 based on training images according to a first training scenario, and using the ML classifier, once trained, to classify images. Once trained, ML classifier 120 classifies images, typically in real-time, in what is referred to as an "inference" stage or operation. In the example of FIG. 9A, ML classifier 120 is configured with a CNN. For example, ML classifier 120 includes a convolutional layer 902 coupled to a fully connected layer 904. In practice, ML classifier 120 may include many convolutional layers leading to the fully connected layer.

For training and for the inference stage, post training, ML classifier 120 receives an image 906 and produces classifications 908 in the form of labels representative of acoustic presets. In the inference stage, at 910, an acoustic preset with a highest confidence is selected based on the labels and their confidence levels, as described above. During training, image 906 represents a training image on which ML classifier 120 trains.

Figure 9B:
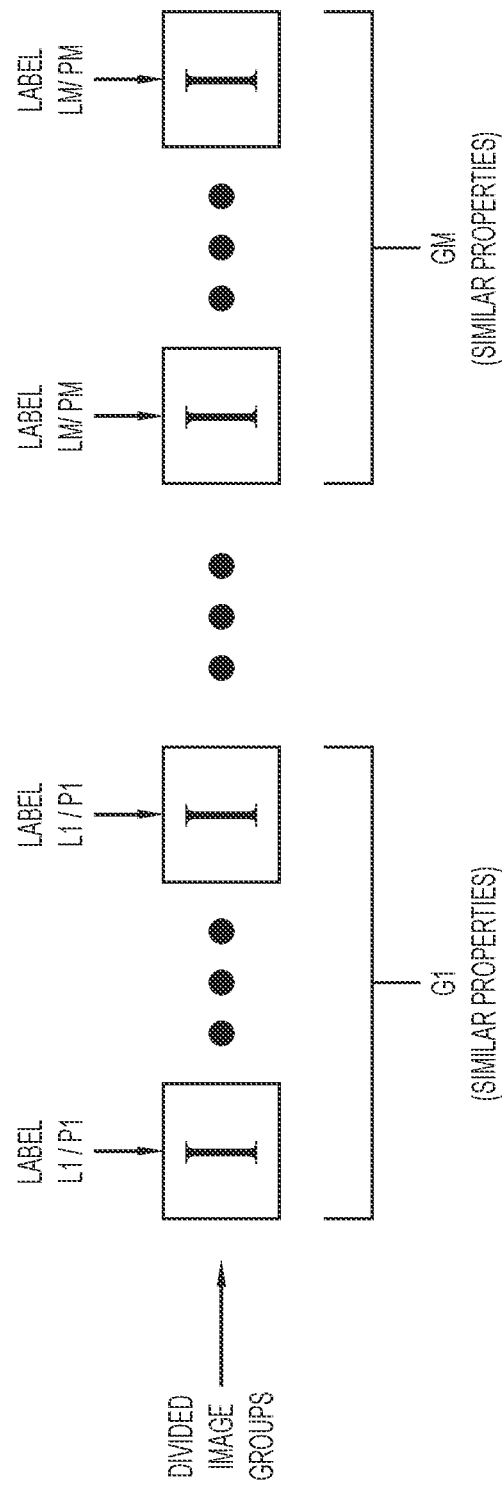
FIG. 9B is an illustration of pre-training data preparation for the training method of FIG. 9A.

In the first training scenario, training of ML classifier 120 may include the following operations:

a. Establish M distinct labels L1-LM, e.g., labels 0-20. The labels may be numeric, alphanumeric, human readable labels, and so on.

b. Create/design M acoustic presets P1-PM representative of respective typical user environments, e.g., rooms. Each preset includes a respective set of acoustic presets AP1-APN, as described above. Each acoustic preset Pi is associated with corresponding label Li.

c. Perform pre-training data preparation: label a large number of training images (e.g., training pictures) of rooms with their most likely acoustic preset among acoustic presets P1-PM. FIG. 9B is an illustration of pre-training data preparation, described below.

i. Divide the training pictures into M groups G1-GM of the training pictures (individually denoted "I" in FIG. 9B), such that the scenes (of rooms) in the training pictures in each group Gi appear to have similar acoustic properties to the scenes (of rooms) in that group, but different acoustic properties from the scenes (of rooms) in other groups. For example: the scenes in the training pictures of group G1 appear to have similar acoustic properties to one another; the scenes in the training pictures of group G2 appear to have similar acoustic properties to one another, but that differ from the acoustic properties of the scenes of the training pictures of group G1; and so on for all M groups G1-GN of training pictures.

ii. Label the groups of the training pictures with respective ones of the most likely acoustic presets among acoustic presets P1-PM. The most likely acoustic preset is the acoustic preset that most likely matches the acoustic properties of the scenes in the training pictures. That is, the training pictures are labeled with respective ones of the acoustic presets that are the same within each group, but differ across the group. For example, assuming that acoustic preset P1 is a best match to the training pictures of group G1, acoustic preset P2 is a best match to the training pictures of group G2, and so on, then label all of the training pictures of group G1 with label L1 for acoustic preset P1, label all of the training pictures of group G2 with label L2 for acoustic preset P2, and so on. This operation produces labeled training pictures, i.e., training pictures labeled with their most likely acoustic preset.

d. Using the labeled training pictures, train ML classifier 120 to classify images to the labels/acoustic presets, directly. That is, the labeled training pictures are supplied to a training input of ML classifier 120, which then trains on the labeled training pictures. ML classifier is trained to classify an image to soft decisions (e.g., softmax) classifications, which associate the classifications with confidence levels, as described above.

Operations (a)-(c) may be performed based on subjective sound design, i.e., substantially manually by a sound designer. The sound designer uses his/her experience with room acoustics to design respective acoustic presets with respective sets of the most likely sounding acoustic parameters for corresponding ones of scenes depicted in training pictures among many training pictures in a training database. That is, the sound designer designs each respective set of acoustic parameters to best represent or match the acoustic properties of a corresponding scene depicted in one of the training pictures based on subject design experience of the designer. For example, the designer selects a first set of reverberation parameters of a first acoustic preset for a "live" room (e.g., a live kitchen), selects a second set of reverberation parameters for a "dead" room (e.g., a heavily carpeted bedroom including fabric covered furniture), selects a third set of reverberation parameters of a third acoustic preset for a room having intermediate reverberation characteristics between those of the "live" room and the "dead" room, and so on. Then, the designer labels the training pictures with their most likely acoustic presets (which each represents a respective set of the acoustic parameters). For example, the designer labels training pictures of similar live-looking rooms with the first acoustic preset, labels training pictures of similar dead-looking rooms with the second acoustic preset, and labels training pictures of similar rooms that appear to have intermediate reverberation with the third acoustic preset, and so on.

An alternative to relying primarily on the experience of the sound designer to establish the acoustic presets for training uses actual acoustic measurements of rooms with different reverberant properties, and then algorithmically derives the acoustic presets from the acoustic measurements. For example, an acoustic impulse response for each room may be measured using any known or hereafter developed technique for measuring the acoustic impulse response of a real-world environment. Then, a set of acoustic parameters of an acoustic preset is algorithmically derived from the measured acoustic impulse response using any known or hereafter developed technique to derive reverberation parameters, for example, from the acoustic impulse response.

In one simplified example, the absolute value of the impulse response can be normalized and converted to a dB magnitude. The time from the initial pulse (normalized to 0 dB) at which the dB magnitude falls below 60 dB is taken as an RT60 decay time (i.e., how long it would take for a sound to decay 60 dB in a room). With added frequency domain analysis, such methods can be extended to multi-band analysis of RT60 times. Similarly, values for initial spectral energies, onset times, early reflection timing, and density, etc., can be directly observed in the impulse response or windowed sections thereof. It is understood that this particular technique is provided by way of example, only, and any additional or alternative methods of impulse analysis may be used.

Once trained, ML classifier 120 may be validated by determining that an arbitrary room model "sounds like" one would expect.

For the inference stage, ML classifier 120 (or logic external to the ML classifier) may be configured to apply a smoothing function on the softmax (output) classification produce by the ML classifier, such that the classification only transitions from its previous state (i.e., previous acoustic preset provided to AES 126) if the softmax classification exceeds a softmax threshold, with some built in hysteresis to avoid spurious classification, similar to the thresholding described above in connection with method 300 of FIG. 3. For example, the acoustic presets may transition smoothly using appropriate delay line interpolation and gain cross-fading.

Training may also leverage transfer learning that takes advantage of a pre-trained neural network that already performs traditional room type classification. This approach freezes the convolutional layer of the pre-trained neural network (at feature extraction) continues to adapt the fully connected layer (classification) using the labels described above.

Figure 10:
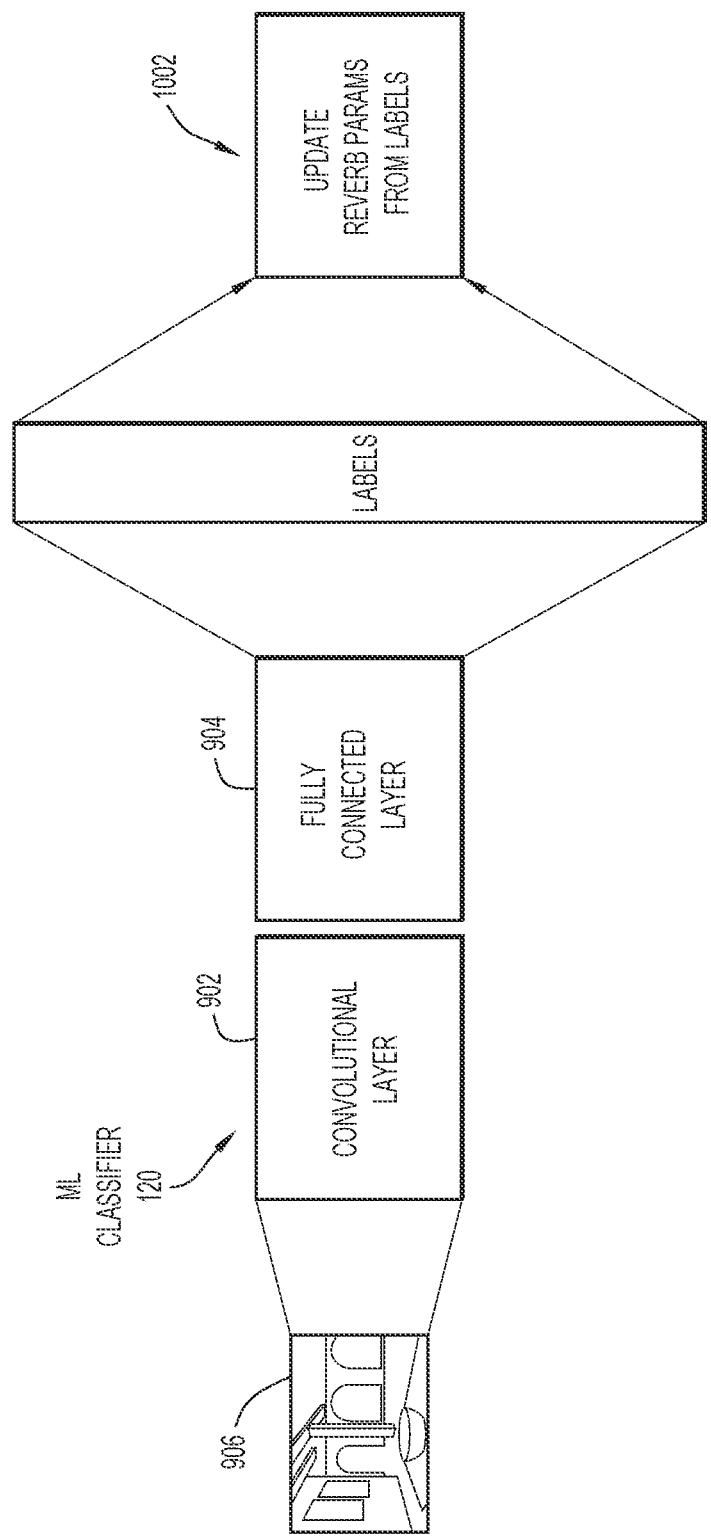
FIG. 10 is an illustration of an example method of training an ML classifier according to second and third training scenarios.

FIG. 10 is a diagram of an example operational flow for ML classifier 120 that shows training of ML classifier 120 according to a second training scenario and a third training scenario, and using the ML classifier, once trained, to classify images. The example of FIG. 10 is similar to the example of FIG. 9A, except that, in the inference stage, at 1002, acoustic parameters are updated from the labels output by classification.

In the second training scenario, the labels may be based on lower level acoustic parameters, such as reverberation parameters. The reverberation parameters may include I3DL2 acoustic parameters, for example. Initially, a sound designer uses his/her experience with room acoustics to design respective acoustic presets with sets of the most likely sounding acoustic parameters for corresponding ones of scenes depicted in training pictures among many training pictures in a training database. That is, each respective set of acoustic parameters is designed to best represent or match the acoustic properties of a corresponding scene depicted in one of the training pictures. Then, during inference, acoustic parameters are updated based on the labels, as shown at 1002.

In the third training scenario, the labels are based on lower level acoustic parameters that are derived from acoustic measurements of real acoustic properties taken in the same room as depicted in a training image. The acoustic measurement may include a measurement of a room (sound) impulse response, for example. Then, pre-training data preparation includes analyzing the room impulse response to automatically tune the appropriate acoustic parameters, i.e., perform automated tuning. The automated tuning, itself, may be based on an ML neural network.

Both the second and third training scenarios may take advantage of ML neural networks.

Figure 11A:
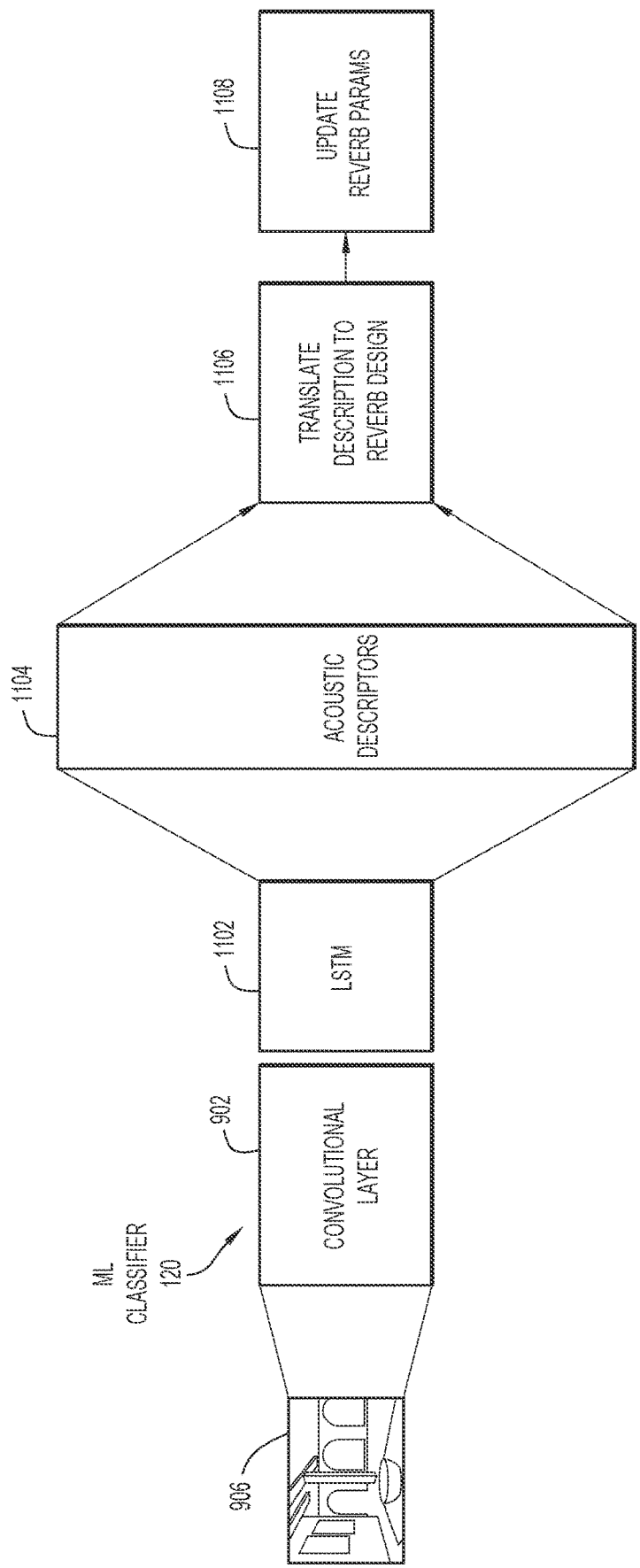
FIG. 11A is an illustration of an example method of training an ML classifier according to a fourth training scenario.

FIG. 11A is a diagram of an example operational flow for ML classifier 120 that shows training of the ML classifier according to a fourth training scenario, and using the ML classifier, once trained, to classify images. The example of FIG. 11A is similar to the examples of FIGS. 9A and 10, except for the following differences. In the example of FIG. 11A, ML classifier 120 includes a long short-term memory (LSTM) 1102 following convolutional layer 902. The neural network based on LSTM 1102 is suitable for image descriptions. In the flow of FIG. 11A, LSTM 1102 classifies to acoustic descriptors 1104. An operation 1106 translates acoustic descriptors 1104 to reverberation parameters, which are used in update operation 1106.

In the fourth training scenario, ML classifier 120 is trained on descriptive features of pictures that have acoustic relevance. Data preparation for pre-training includes labeling pictures of scenes of rooms with the given acoustics vocabulary. Although the example of FIG. 11A includes LSTM 1102, the LSTM may be replaced by a fully connected layer (e.g., fully connected layer 904) if the focus is the most likely combination of labels (e.g. big, live, tile, and so on). Training includes a large number of training pictures labeled with the acoustic-specific descriptors.

Figure 11B:
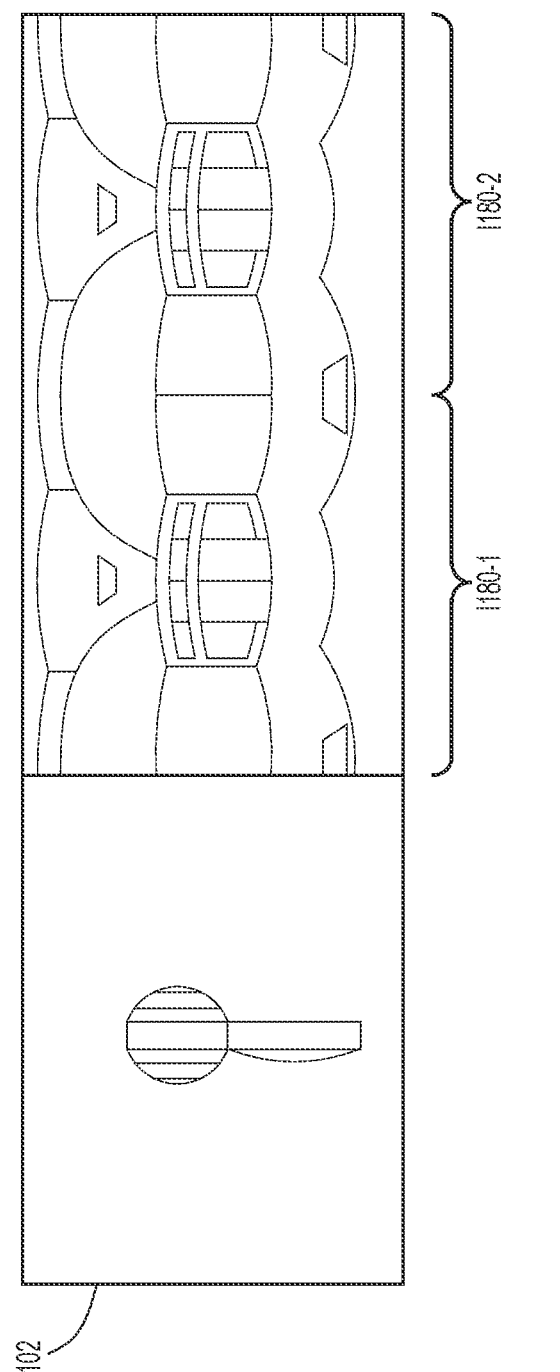
FIG. 11B is an illustration of an example image sensor that includes back-to-back 180° fish eye lenses, and which captures a 360° image of a room in two camera perspectives.

With reference to FIG. 11B, there is an illustration of an example of image sensor 102 (e.g. a camera) that includes back-to-back 180° fish-eye lenses, which together capture a 360° image of a room in two camera perspectives (images) 1180-1 and 1180-2, i.e., which capture a scene of an entire room. In this example, XR processor 108 may stitch together the different camera perspectives into a single rectangular image frame using any known or hereafter developed equi-rectangular projection technique. XR processor 108 provides the single rectangular image frame to ML classifier 120 for processing, during training or during the inference/real-time stage. In another example, traditional rectangular images may be used to train ML classifier 120. Alternatively, the traditional rectangular images may be stitched together into a larger image, e.g., a composite image, based on tracing a room as a user/viewer points a camera at different views of the room. The resulting stitched image may be applied to ML classifier 120 even when the ML classifier has been trained on 360 images. In another example, image sensor 102 captures the rectangular image of the room, and XR processor 108 maps the rectangular image to an area on an equi-rectangular space, to produce a mapped image, and ML classifier 120 classifies the mapped image. Any known or hereafter developed technique may be used to map the rectangular image to the equi-rectangular space.

XR Processor Example

Figure 12:
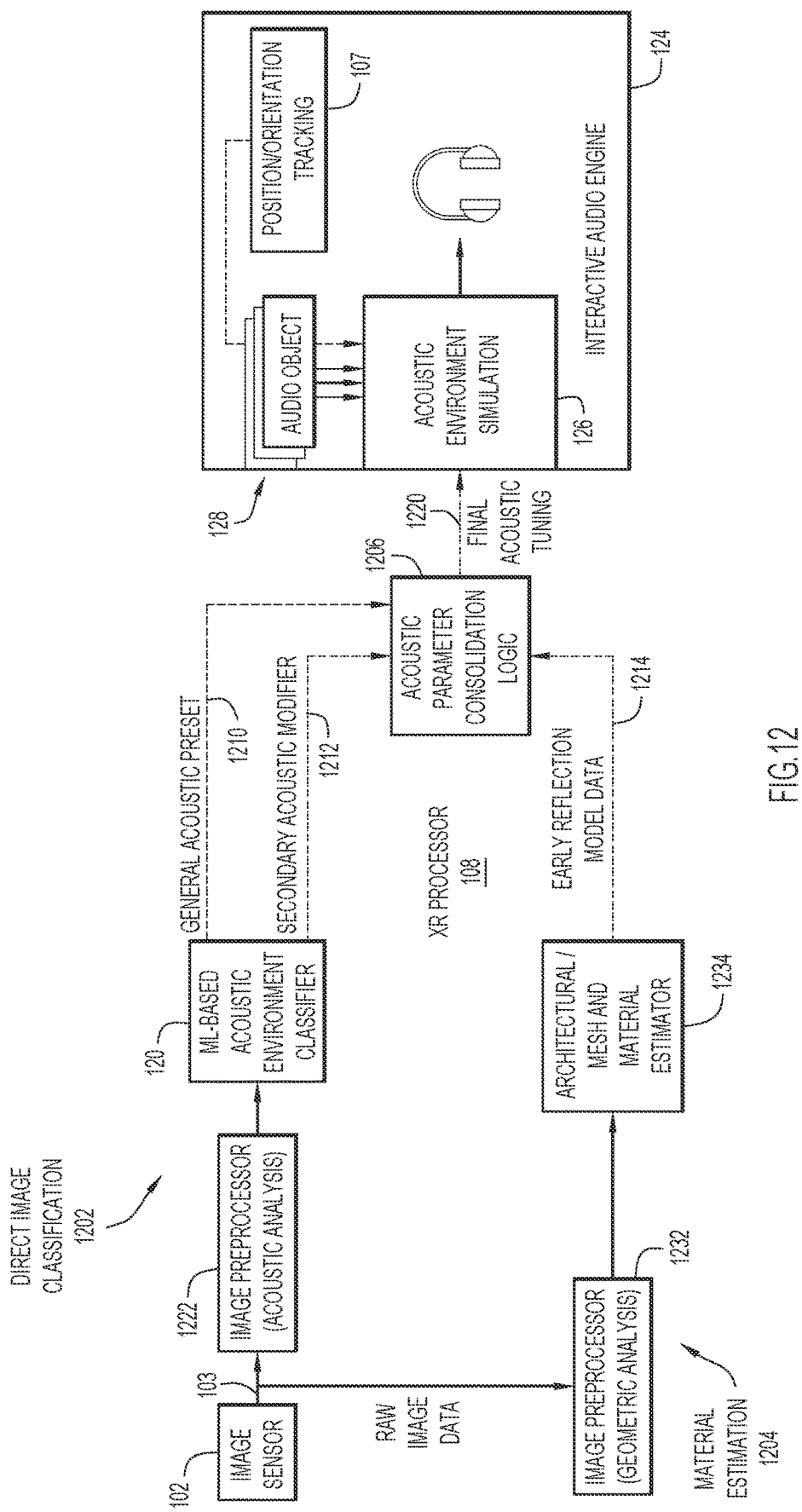
FIG. 12 is a block diagram of an example XR processor that includes additional functionality compared to the XR processor embodiment of FIG. 1A.

FIG. 12 is a block diagram of XR processor 108 according to an embodiment that includes additional functionality compared to that provided by the embodiment of the XR processor of FIG. 1A. In the example of FIG. 12, XR processor 108 includes an image classification path 1202, a material estimation path 1204, acoustic parameter consolidation (APC) logic 1206, and IAE 124. Image classification path 1202 processes images 103 from image sensor 102 to produce a general/primary acoustic preset 1210 and a secondary acoustic modifier 1212, and provides the general acoustic preset and the secondary acoustic modifier to APC logic 1206. Material estimation path 1204 process images 103 from image sensor 102 in parallel with image classification path 1202 to produce early reflection model data (ERE) (also referred to as "early reflection parameters") 1214, and provides the early reflection model data to APC logic 1206. APC logic 1206 processes general acoustic preset 1210, secondary acoustic modifier 1212, and early reflection model data 1214 together to produce final acoustic tuning parameters 1220, and provides them to AES 126 of IAE 124.

Image classification path 1202 includes an image preprocessor 1222 (for acoustic analysis) followed by ML classifier 120. Image preprocessor 1222 processes images 103, i.e., raw image data, to produce images in a format suitable for consumption by ML classifier 120. Image preprocessor 1222 formats the raw image data, and/or selects, recalls, or aggregates the raw image data to match training assumption for ML classifier 120. For example, image preprocessor 1222 may stitch together successive ones of images 103 to produce stitched images for classification, as described above.

Assuming ML classifier 120 has been trained to classify images to both general acoustic presets (with their confidence levels) and secondary acoustic modifiers, directly, the ML classifier classifies each of the images from image preprocessor 1222 to general acoustic preset 1210 and acoustic modifier 1212, directly. In an example, general acoustic preset 1210 incudes initial reverberation parameters, and secondary acoustic modifier 1212 may include one or more of an acoustic absorption parameter, an acoustic reflection parameter, an acoustic diffusion parameter, and specific environment (e.g., room) dimensions.

ML classifier 120 may produce general acoustic preset 1210 and secondary acoustic modifier 1212, concurrently, provided there is sufficient image information, and sufficient ML classifier (e.g., neural network) processing power, for both types of classification to proceed concurrently. Alternatively, ML classifier 120 may (i) initially produce only general acoustic preset 1210 based on initially received images and/or initially limited processing power, and, (ii) when further images arrive and/or further processing power is available, concurrently produce both the general acoustic preset 1219 and secondary acoustic modifier 1212.

APC logic 1206 modifies the (initial) reverberation parameters of general acoustic preset 1210 based on acoustic modifier 1212, to produce a modified general acoustic preset including modified reverberation parameters, and provides the modified general acoustic preset to AES 126 in final acoustic tuning parameters 1220.

Material estimation path 1204 includes an image preprocessor 1232 (for geometric analysis) followed by an architectural mesh and material estimator (referred to simply as a "material estimator") 1234. Image preprocessor 1232 processes the raw image data in images 103, to produce images for consumption by material estimator 1234. Material estimator 1234 constructs a (digital) architectural 3D mesh for the scenes depicted in the images, estimates types of materials depicted in the scenes based on the architectural 3D mesh, and estimates acoustic properties of the materials, to produce early reflection model data (e.g., parameters) 1214 that includes the acoustic properties. Image preprocessor 1232 and material estimator 1234 may perform geometrical image analysis, generate an architectural mesh, and estimate material properties from the mesh using any known or hereafter developed techniques.

APC logic 1206 combines early reflection model data 1214 with the modified general acoustic preset into final acoustic tuning parameters 1220. Alternatively and/or additionally, APC logic 1206 may further modify the modified general acoustic preset using various parameters in early reflection model data 1214.

In an embodiment that omits material estimation path 1204, early reflection model data 1214 may still be used, but set to default values, for example.

Figure 13:
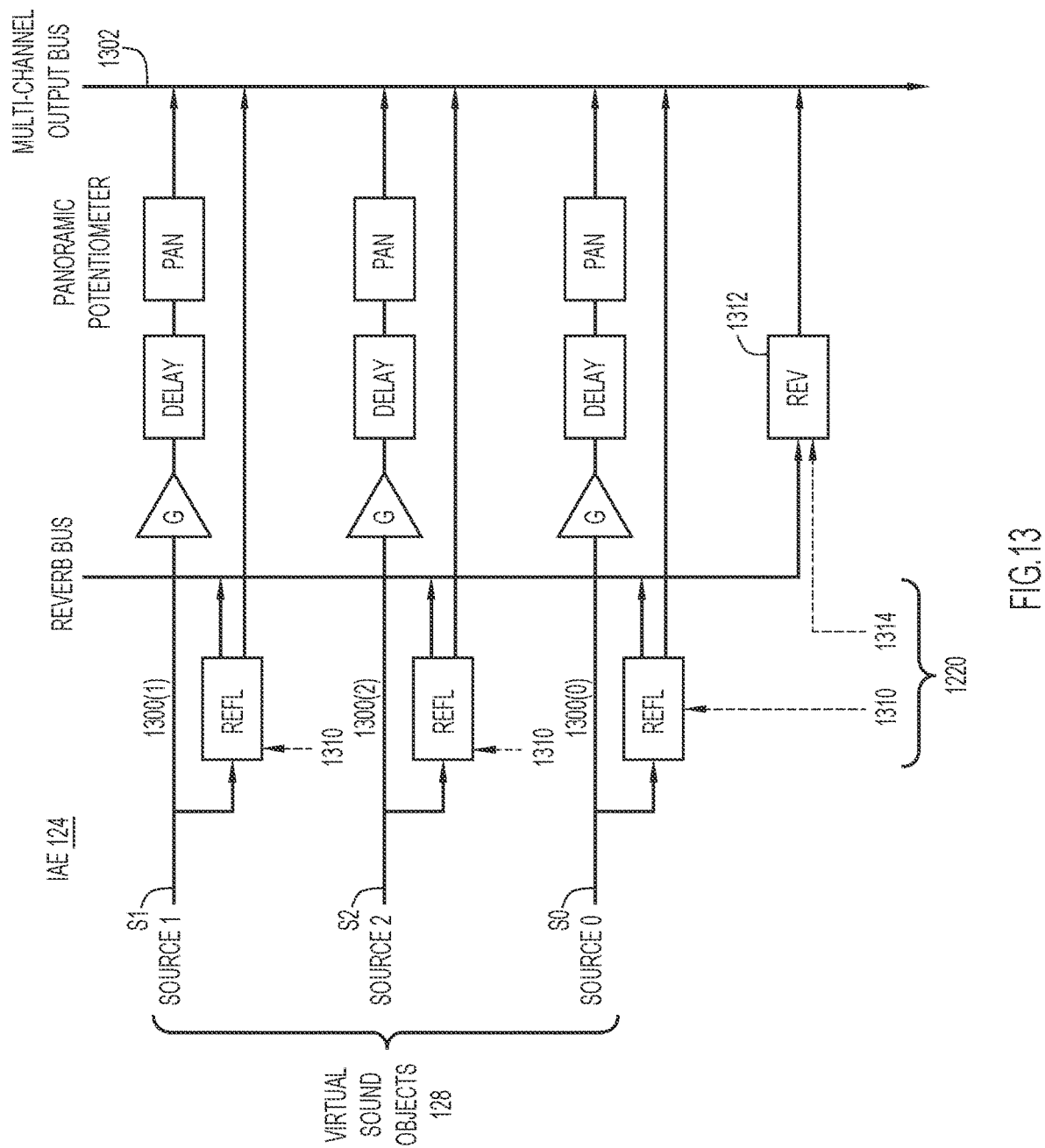
FIG. 13 there is a block diagram of an example interactive audio engine (IAE) that may be used in or with an XR processor to perform an audio environment simulation based on acoustic parameters.

FIG. 13 there is a block diagram of a portion of IAE 124 used to perform AES 126 based on acoustic parameters of final acoustic tuning parameters 1220. IAE 124 includes sound channels 1300(1)-1300(0) that receive respective sound signals S1-SO from respective ones of virtual sound objects 128. Each channel 1300(i) provides a respective direct path for sound signal Si to multi-channel output bus 1302, through a series of tunable gain (G), delay, and panoramic potentiometer (pan) stages. The resulting per-channel direct path sound signals are mixed into multi-channel output bus 1302. Each channel 1300(i) also provides a respective reflection path for sound signal Si to multi-channel output bus, through a tunable reflection stage (refl) that controls the reflection responsive to a reflection control signal 1310. Reflection control signal 1310 may include one or more acoustic parameters of final acoustic tuning 1220, described above. The resulting per-channel reflections are also mixed into multi-channel output bus 1302. IAE 124 also includes a reverberation generator (rev) 1312 fed by the per-channel reflections, and configured to reverberate the combined direct path sound signals and reflections combined on multi-channel output bus 1302 responsive to a reverberation control signal 1314. Reverberation control signal 1314 may include acoustic parameters (e.g., reverberation parameters) of final acoustic tuning parameters 1220.

Figure 14:
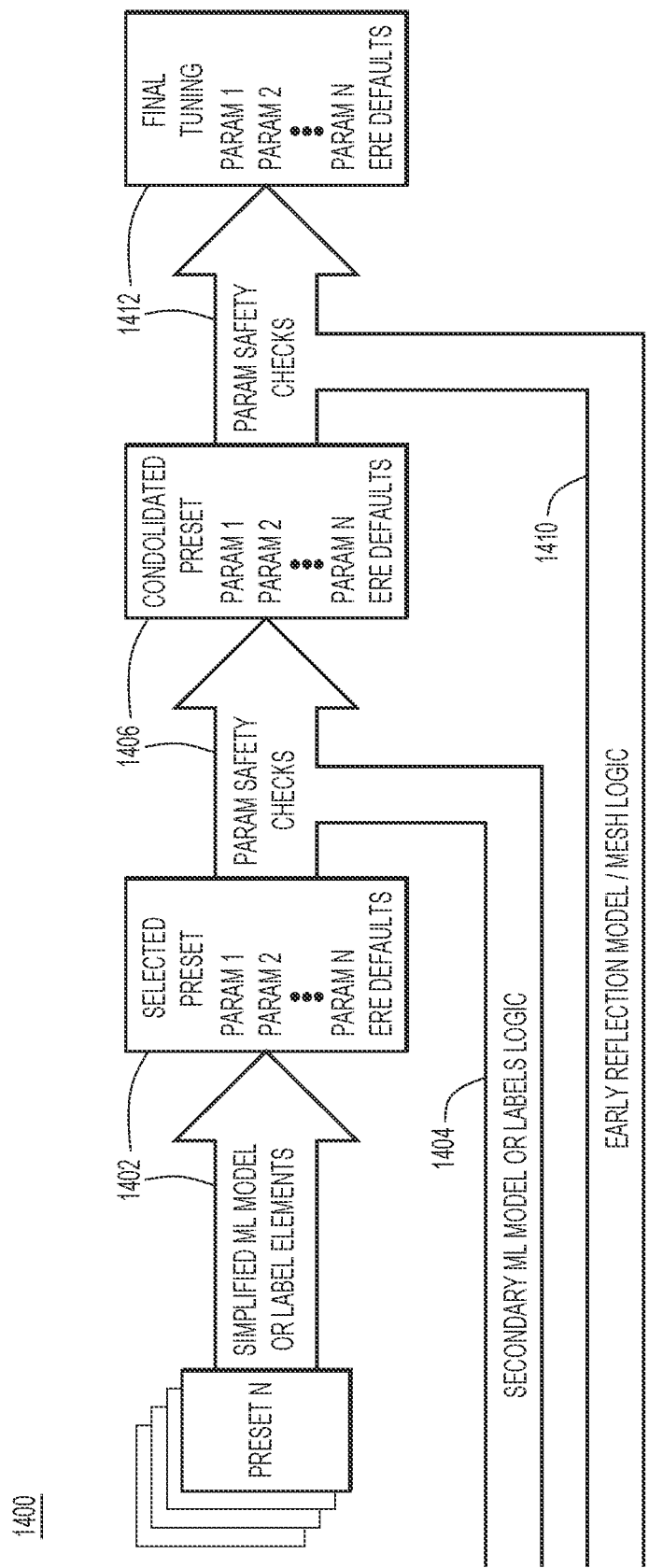
FIG. 14 is a flow diagram of an example acoustic parameter refinement process that may be performed by the XR processor of FIG. 12.

FIG. 14 is a diagram of an example acoustic parameter refinement process 1400 that may be performed by XR processor 108 of FIG. 12, for example. At 1402, initial image data flows into ML classifier 120, and the ML classifier classifies the initial image data directly, to produce soft decision labels for general acoustic presets P1-PM (e.g., general acoustic presets 1210). Each acoustic preset Pi includes a respective set of N acoustic parameters AP1-APN (Param 1-Param N). One of general acoustic presets P1-PM is selected based on confidence levels, to produce a selected general acoustic preset. Early reflection model data (ERE) default parameters (e.g., default values for early reflection model data 1214) may be added to the selected general acoustic preset.

At 1404, further image data flows into ML classifier 120 and, based on the further image data, the ML classifier produces secondary acoustic modifiers (e.g., secondary acoustic modifiers) 1212 in addition to general acoustic presets P1-PM.

At 1406, acoustic parameter safety check logic performs acoustic parameter safety checks on the selected general acoustic preset and the secondary acoustic modifiers to ensure the aforementioned acoustic parameters are within reasonable bounds given the (current) selected general acoustic preset, and additional information useful for performing the safety check. Following the safety checks, APC logic 1206 modifies the selected general acoustic preset based on the secondary acoustic modifiers, to produce a modified/consolidated acoustic preset, including the N acoustic parameters, as modified. The ERE default parameters are retained with the modified/consolidated acoustic preset.

At 1410, material estimation path 1204 generates early reflection model data 1214 based on the initial image data and the further image data.

At 1412, the acoustic parameter safety check logic performs acoustic parameter safety checks on the modified/consolidated acoustic preset and early reflection model data 1214. APC logic 1206 further modifies the modified/consolidated acoustic preset based on early reflection model data 1214, or simply adds the early reflection data to the modified preset, to produce final acoustic tuning parameters 1220.

FIG. 15 is a table of example acoustic parameters generated by XR processor 108 of FIG. 12 for images of a room. The table maps general acoustic parameters of general acoustic presets of a first row in the table, secondary acoustic parameters of a second row of the table, and early reflection data parameters in a third row of the table to various properties of the aforementioned parameters depicted in columns of the table. The first column of the table identifies the aforementioned three types of acoustic parameters. The next or middle two columns include information associated with (descriptive) labels of tags produced by ML classifier 120 and material estimation path 1204, as indicated in the columns. The last column provides examples of reverberation parameters and ERE parameters.

Cache Embodiment

Figure 16:
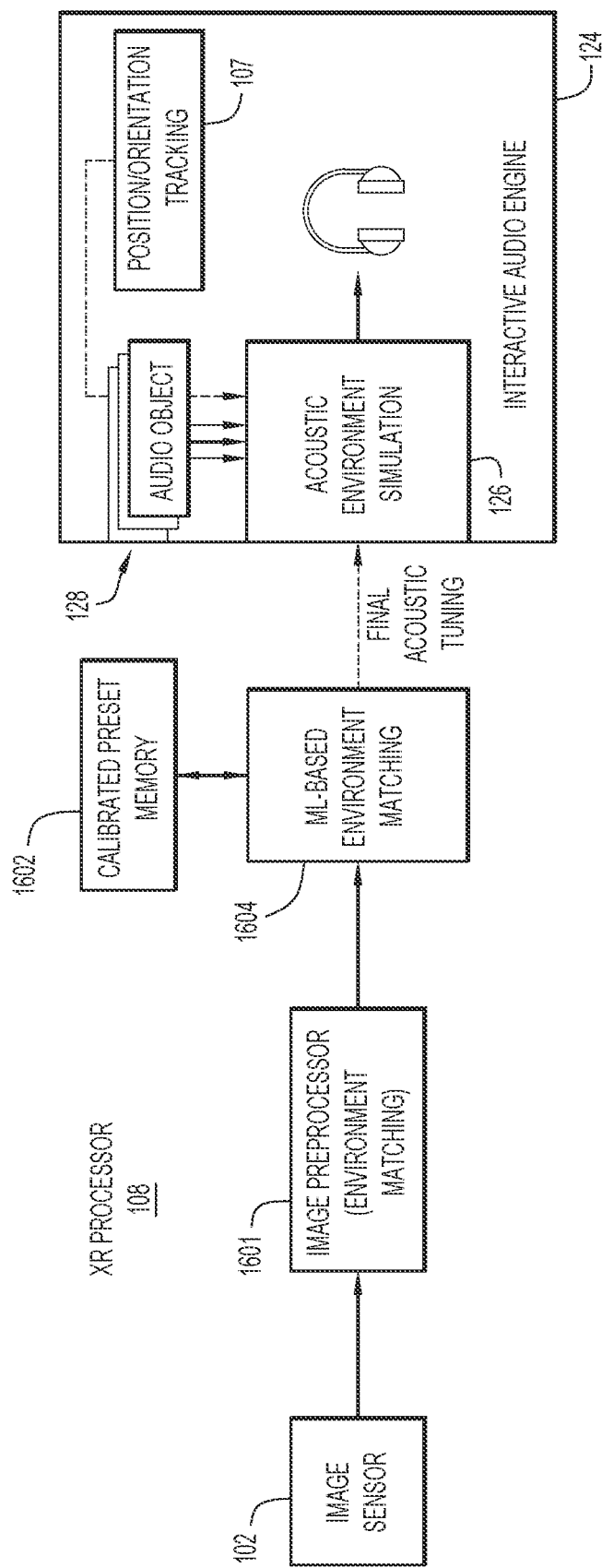
FIG. 16 is a block diagram of an example XR processor that uses cached acoustic presets.

FIG. 16 is a block diagram of XR processor 108 in an embodiment that uses cached acoustic presets associated with known real-world environments, as described above in connection with method 600 of FIG. 6. During a calibration operation, image preprocessor 1601 and ML classifier 120 operate together to store in a calibrated preset memory or cache 1602 acoustic parameters corresponding to previous "scenes." After calibration, in real-time, image preprocessor 1601 (which performs image matching) along with logic 1604 (which may include ML classifier 120) identify acoustic parameters from known real-time images, and recall the identified acoustic parameters without a full image analysis, as described above. In the embodiment of FIG. 16, the machine learning is focused on an easier task of matching the room to one of the pre-calibrated scenes.

In the embodiment of FIG. 16, APC logic 1206 may be omitted, when calibrated preset memory or cache 1602 stores general acoustic presets, secondary acoustic parameters, and early reflection model data, and when such data has already been subjected to acoustic parameter safety checks. IAE 124 finalizes reflections based on position information for virtual sound objects 128 and position information 114.

Flowcharts for Acoustic Preset Transition Methods

Figure 17:
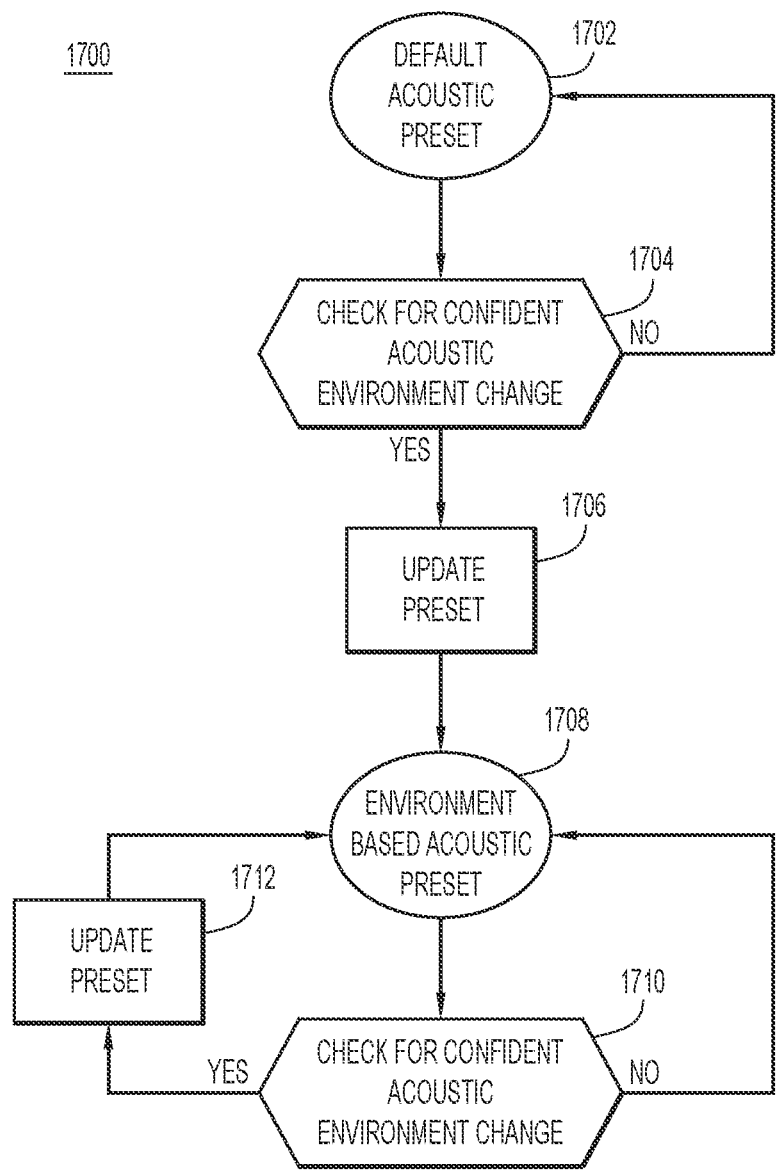
FIG. 17 is a flowchart of an example method of transitioning between acoustic presets.
Figure 18:
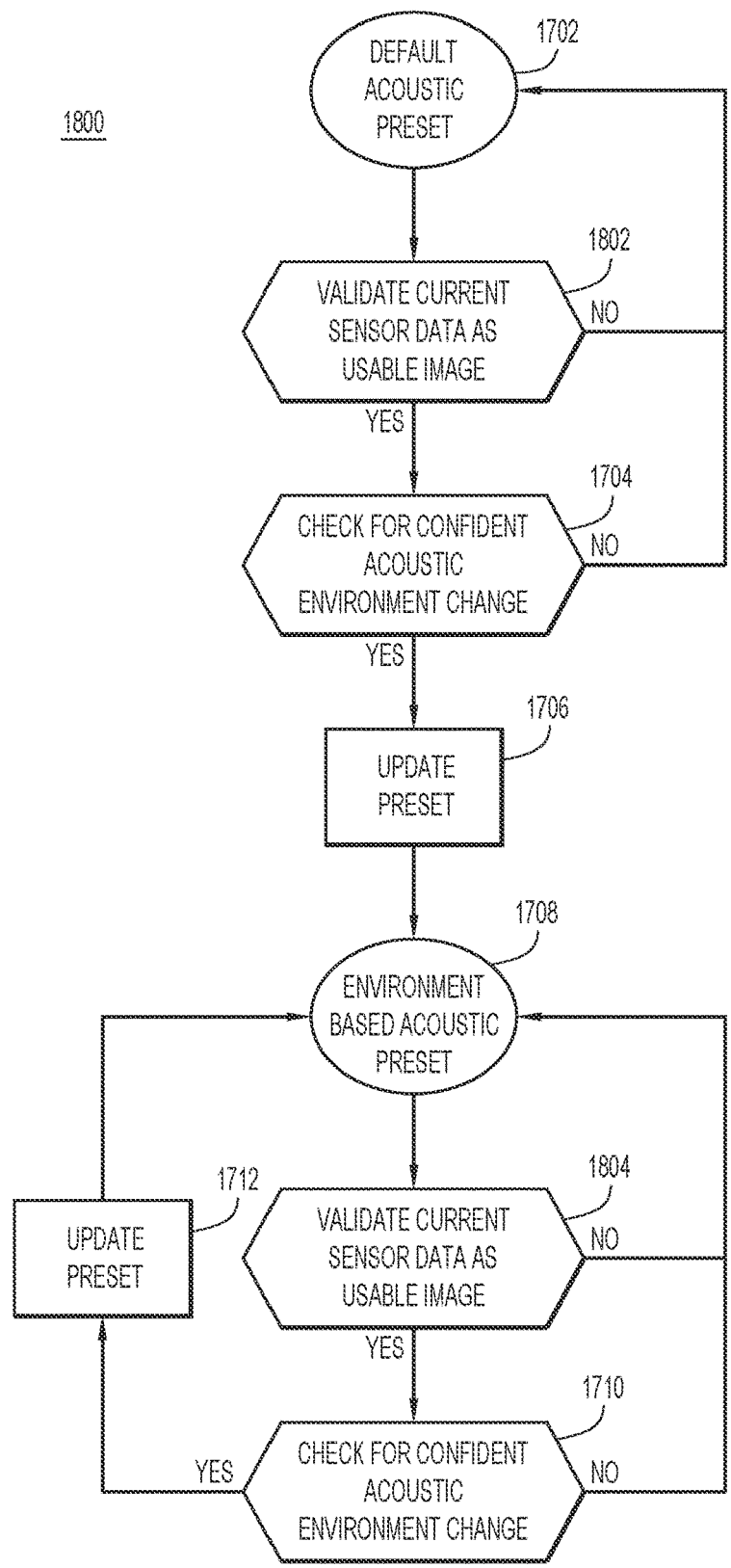
FIG. 18 is a flowchart of an example method of transitioning between acoustic presets and performing usable image safety checks.
Figure 19:
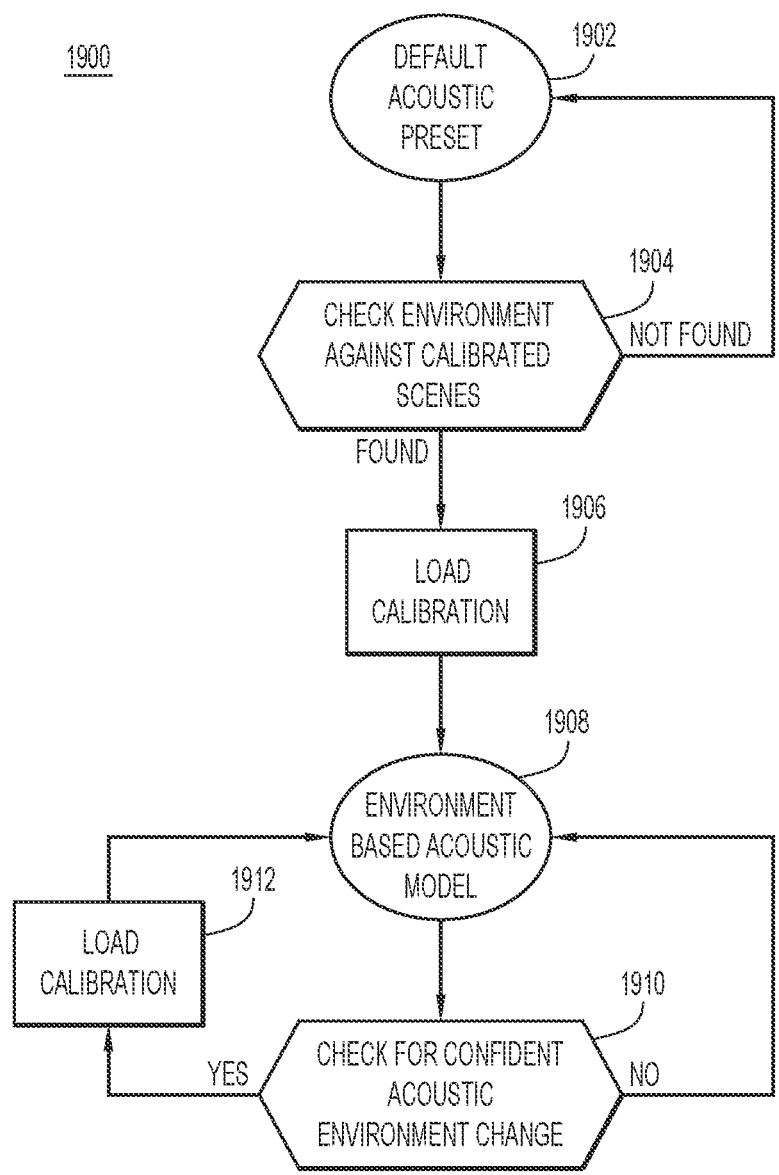
FIG. 19 is a flowchart of an example method of transitioning between acoustic presets in a calibrated scene embodiment.

FIGS. 17-19 are directed to methods of transitioning between acoustic presets based on confidence levels of softmax classifications, adding usable image safety checks to the transitioning, and performing the transitioning between acoustic presets in a calibrated scene embodiment, respectively. Generally, the methods of FIGS. 17-19 prevent classifiers of general/primary acoustic presets and secondary acoustic modifiers from being forced to guess on images or real-world scenes that do not have meaningful/discernible features.

FIG. 17 is a flowchart of an example method 1700 of transitioning between acoustic presets, e.g., reverberation presets. At a loop including 1702 and 1704, method 1700 establishes a default acoustic preset for IAE 124 and checks for a confident acoustic environment change. If there is confident acoustic environment change, flow proceeds to 1706 to update the acoustic preset, from which flow proceeds to 1708. Otherwise, flow returns to the loop. At a loop including 1708, 1710, and 1712, method 1700 receives an environment-based acoustic preset at 1708, and checks for a confident acoustic environment change at 1710. If there is a confident acoustic environment change, flow proceeds to 1712 to update the acoustic preset. Otherwise, flow proceeds back to 1708.

FIG. 18 is a flowchart of an example method 1800 of transitioning between acoustic presets and performing usable image safety checks. Method 1800 is similar to method 1700, except that method 1800 further includes operations 1802 and 1804 that validate that current sensor data (i.e., images) as usable images. For example, operation 1802, inserted between operations 1702 and 1704, validates the current sensor data as usable image(s). If yes, flow proceeds from to 1702 to 1704, while, if no, flow returns to 1702. Similarly, operation 1804 is inserted between operations 1708 and 1710, and conditions flows between those operations similarly to the way operation 1804 conditions flow between operations 1702 and 1704.

FIG. 19 is a flowchart of an example method 1900 of transitioning between acoustic presets in a calibrated scene embodiment, such as the embodiment depicted in FIG. 16. At a loop including 1902 and 1904, method 1900 establishes a default acoustic preset and checks the current scene against scenes associated with calibrated scenes. If a calibrated scene is not found, flow returns to 1902. Otherwise, when a calibrated scene is found, flow proceeds to 1906, where method 1900 updates the default acoustic preset with a calibrated acoustic preset. Flow proceeds from 1906 to 1908, 1910, and 1912, which repeat the operations performed at 1902, 1904, and 1906, but starting with the updated calibrated acoustic preset from 1906 instead of the default acoustic preset.

Training Process

Figure 20:
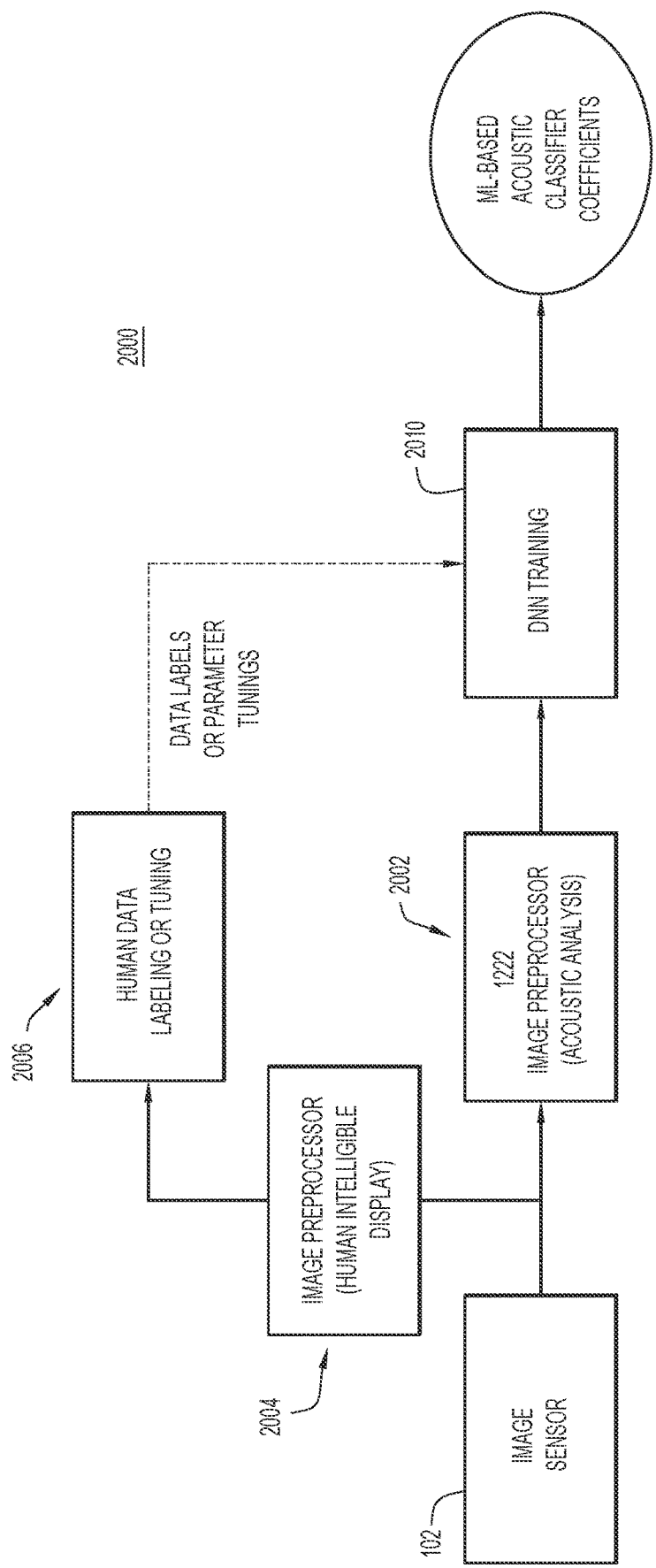
FIG. 20 is an illustration of an example method of deep neural network (DNN) training of an ML classifier, beginning with the ML classifier in an untrained condition state.

FIG. 20 is a block diagram that shows an example training process 2000 used for deep neural network (DNN) training of ML classifier 120 as initially untrained, representative of training methods discussed above in connection with FIGS. 9, 10, and 11A. At 2002, image preprocessor 1222 formats training images of real-world environments from image sensor 102 for consumption by untrained ML classifier 120, and provides the training images (as formatted) to a training input of the ML classifier. At 2004, an image preprocessor function presents the training images to a user/human operator on a display in a user friendly, easily viewable format. At 2006, the user applies to each of the training images labels/acoustic tuning parameters corresponding to acoustic presets, secondary parameters, and so on, such that the acoustic parameters match the real-world environments/scenes in the training images. The user associates the labels/acoustic tuning parameters with respective ones of the training images input to untrained ML classifier 120, so that the training images correlate with their labels. At 2010, the one or more neural networks of ML classifier 120 train on the labeled training images. The training at 2010 updates filter coefficients of the neural networks of ML classifier 120 based on the features in the training images, which results in a trained version of ML classifier 120. Thus, the training process configures the one or more neural networks of ML classifier 120 to classify images directly to their corresponding acoustic presets.

Computer Device

Figure 21:
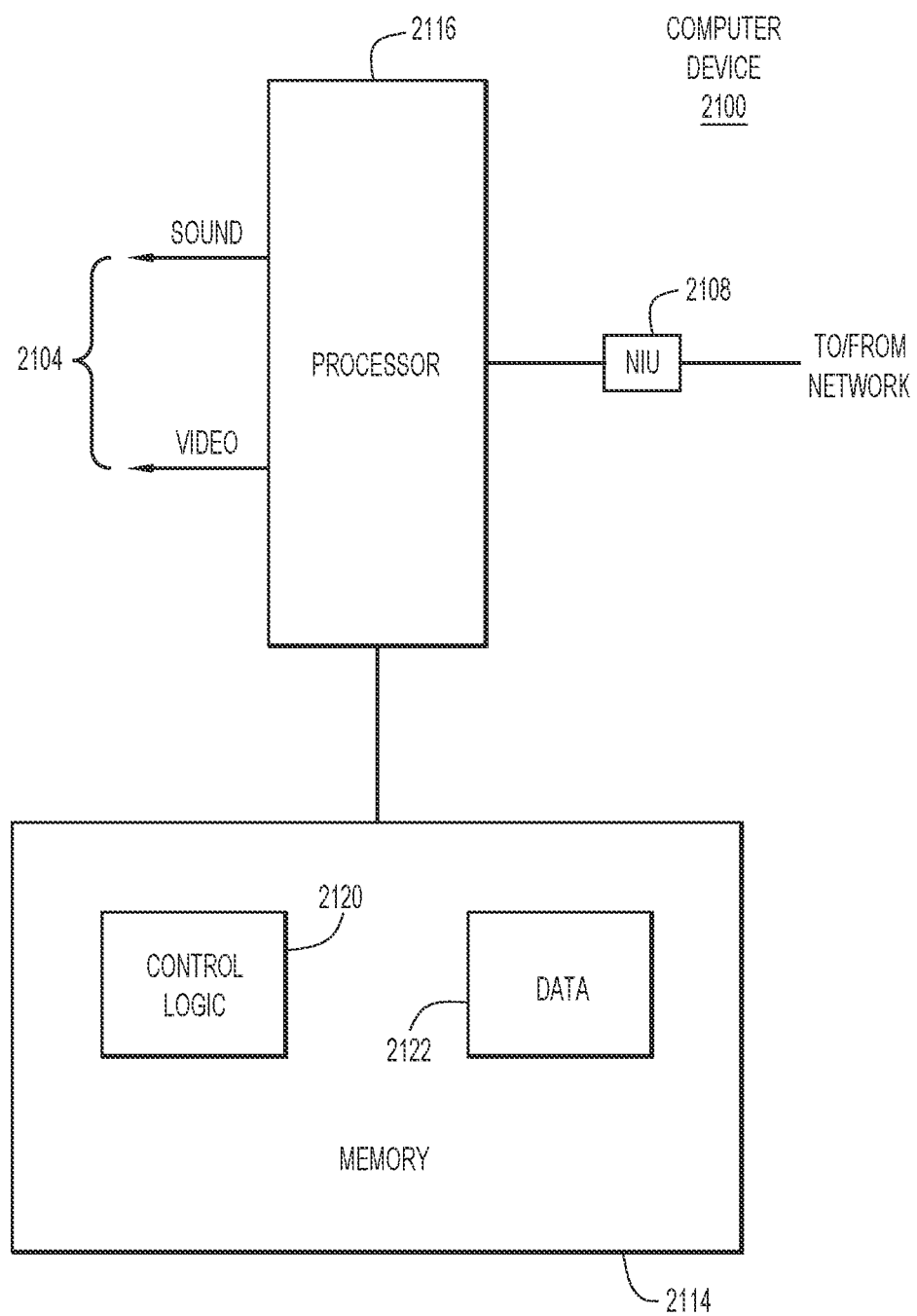
FIG. 21 is a block diagram of an example computer device in which an XR processor and/or an interactive audio engine may be implemented.

With reference to FIG. 21, there is a block diagram of an example computer device 2100 in which XR processor 108 and IAE 124 may be implemented. There are numerous possible configurations for device 2100 and FIG. 21 is meant to be an example. Examples of device 2100 include a tablet computer, a personal computer, a laptop computer, a mobile phone, such as a smartphone, and so on. Device 2100 may include outputs 2104 to drive a display and headphones. Device 2100 may also include one or more network interface units (NIUs) 2108, and memory 2114 each coupled to a processor 2116. The one or more NIUs 2108 may include wired and/or wireless connection capability that allows processor 2116 to communicate over a communication network. For example, NIUs 2108 may include an Ethernet card to communicate over an Ethernet connection, a wireless RF transceiver to communicate wirelessly with cellular networks in the communication network, optical transceivers, and the like, as would be appreciated by one of ordinary skill in the relevant arts.

Processor 2116 may include a collection of microcontrollers and/or microprocessors, for example, each configured to execute respective software instructions stored in the memory 2114. Processor 2116 may be implemented in one or more programmable application specific integrated circuits (ASICs), firmware, or a combination thereof. Portions of memory 2114 (and the instructions therein) may be integrated with processor 2116. As used herein, the terms "acoustic," "audio," and "sound" are synonymous and interchangeable.

The memory 2114 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 2114 may comprise one or more computer readable storage media (e.g., a memory device) encoded with software comprising computer executable instructions and when the software is executed (by the processor 2116) it is operable to perform the operations described herein. For example, the memory 2114 stores or is encoded with instructions for control logic 2120 to perform operations described herein related to ML classifier 120, IAE 124, image preprocessors 1222 and 1232, APC logic 1206, material estimation path 1204, and the methods described above.

In addition, memory 2114 stores data/information 2122 used and generated by logic 2120, such as images, acoustic parameters, neural networks, and so on.

Summary Method Flowcharts

Figure 22:
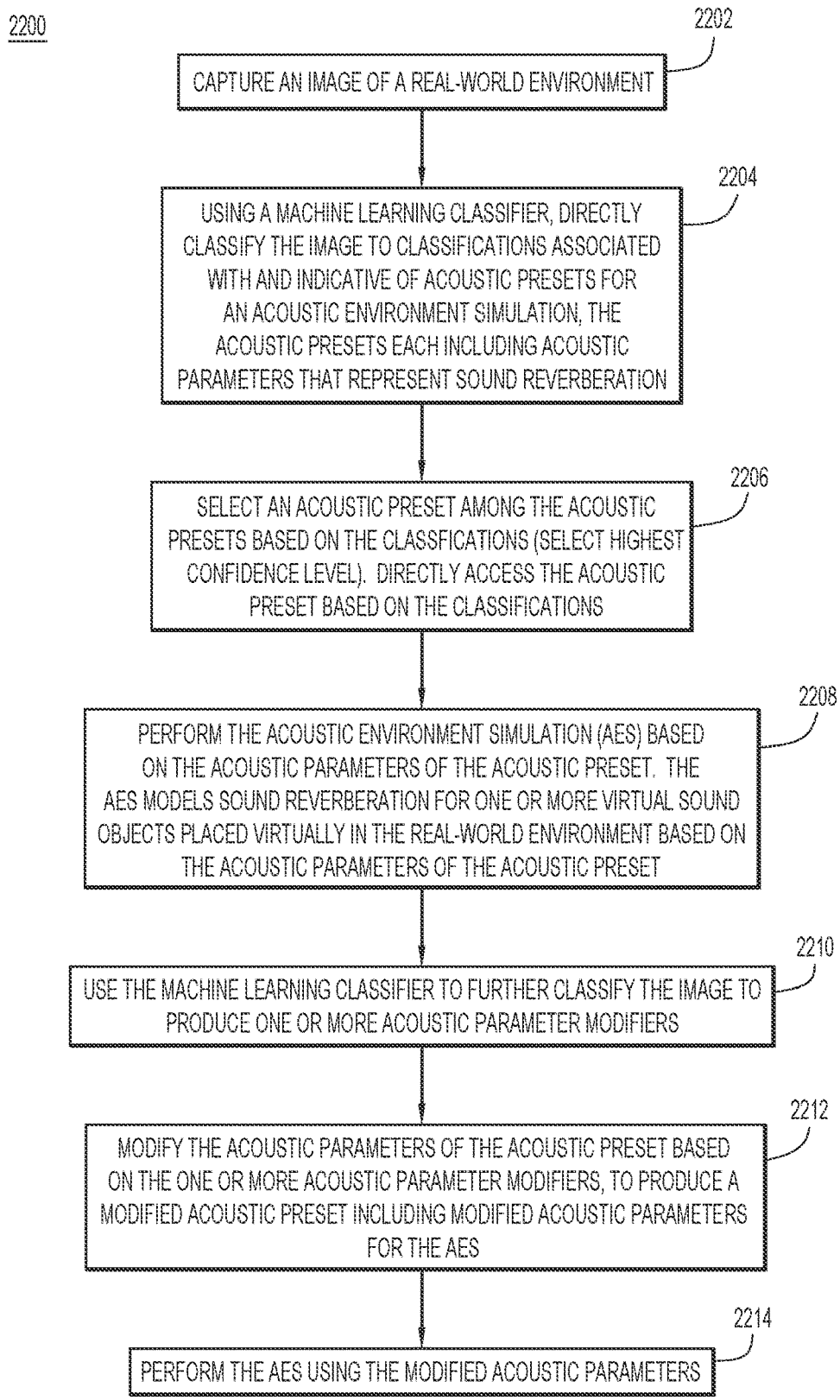
FIG. 22 is a flowchart of an example summary method of directly classifying an image to acoustic presets.

With reference to FIG. 22, there is a flowchart of an example method 2200 of classifying an image that includes various operations described above.

At 2202, the method receives an image of a real-world environment. To do this the method may capture the image using an image sensor, or access the image from a file of pre-stored images.

At 2204, the method uses an ML classifier, already or previously trained as described herein, to receive the image captured at operation 2202 and to directly classify the image to classifications associated with, and indicative of, (known) acoustic presets for an AES. The classifications include respective confidence levels. The acoustic presets each includes (known) acoustic parameters that represent sound reverberation for the AES.

At the time of the classifying in operation 2204, the acoustic presets and their respective parameters are already known from the a priori training of the ML classifier. Thus, the ML classifier classifies the image "directly" to the classifications associated with and indicative of the acoustic presets without classifying to a room type first, which would then require further operations to derive acoustic parameters from the room type, for example. The directly classifying of operation 2204 is essentially a single classifying operation flowing from the image to the classifications that provides direct access to known/predetermined acoustic parameters associated with the classifications, without intervening parameter translations. Moreover, the AES uses the acoustic presets directly, i.e., as is. In an embodiment, the ML classifier was trained on (labeled) training images of real-world environments divided into different groups of the training images. The training images of the different groups of the training images are labeled with respective ones of the acoustic presets that are the same within each of the different groups, but that differ across the different groups. The training images may also be further labeled with additional (secondary) acoustic parameters, exploited in further operations 2210-2214, described below.

At 2206, the method selects an acoustic preset among the acoustic presets (i.e., a particular one of the acoustic presets) based on the confidence levels of the classifications. The method accesses/retrieves the acoustic preset.

At 2208, the method performs the AES based on the acoustic parameters of the acoustic preset. The AES models sound reverberation for one or more virtual sound objects placed virtually in the real-world environment based on the acoustic parameters of the acoustic preset.

At 2210, the method use the machine learning classifier to further classify the image, or to classify one or more further images, directly, to produce one or more acoustic parameter modifiers. The further classifying may be concurrent with the classifying of operation 2204. Alternatively, the further classifying may result from receiving and classifying additional or subsequent images.

At 2212, the method modifies the acoustic parameters of the acoustic preset from 2206 based on the one or more acoustic parameter modifiers from 2210, to produce a modified acoustic preset including modified acoustic parameters for the AES.

At 2214, the method performs the AES using the modified acoustic parameters.

Different combinations of operations 2202-2206 of method 2200 may represent separate and independent embodiments. For example, operations 2202-2206 collectively represent an independent embodiment.

Figure 23:
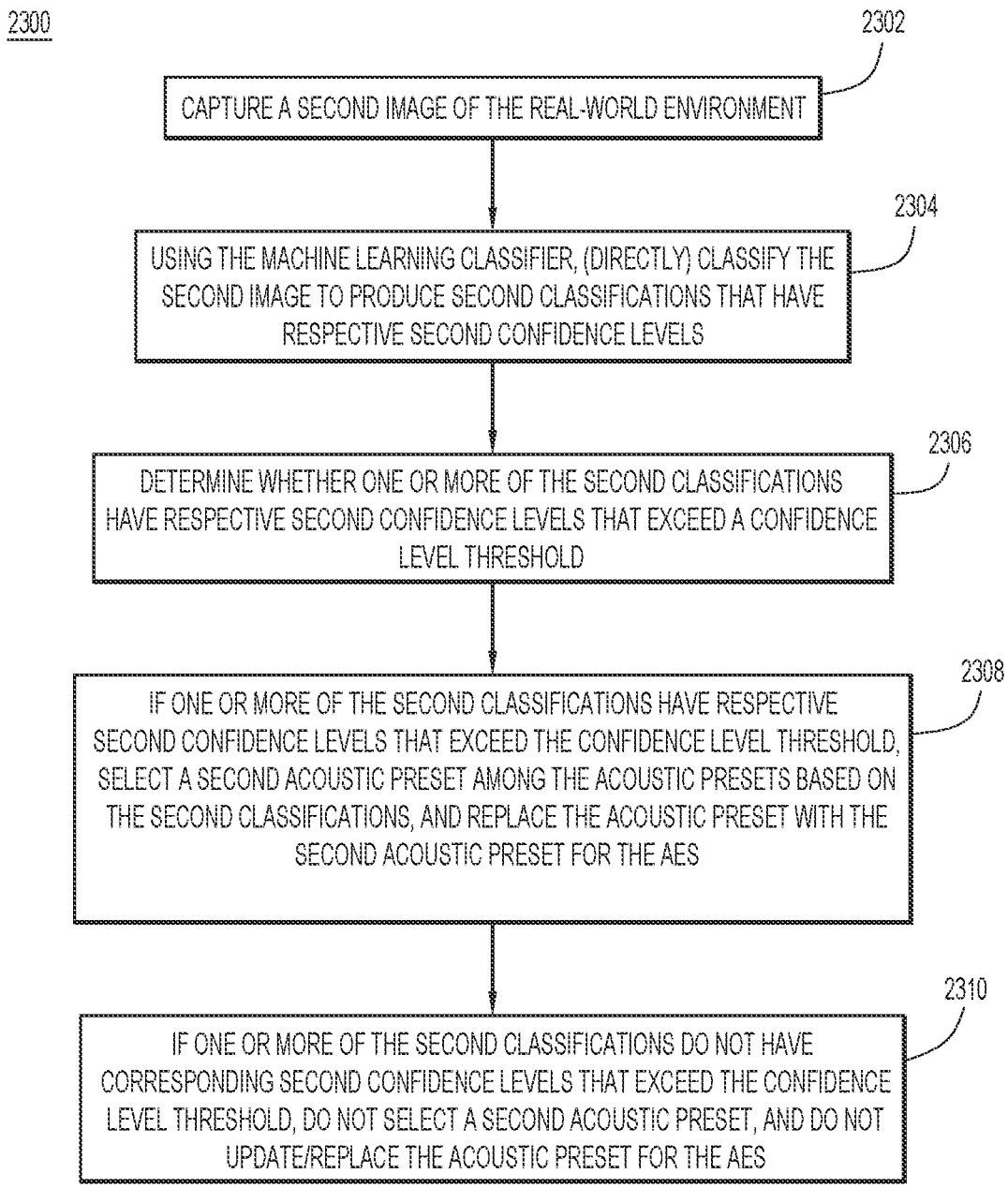
FIG. 23 is a flowchart of an example method of directly classifying a subsequent or second image relative to the image classified in the method of FIG. 22.

With reference to FIG. 23, there is a flowchart of an example method 2300 of classifying a subsequent or second image relative to the image classified in method 2200. Method 2300 includes various operations described above.

At 2302, the method captures/receives a second image of the real-world environment.

At 2304, using the machine learning classifier, the method directly classify the second image to produce second classifications that have respective second confidence levels.

At 2306, the method determines whether one or more of the second classifications have respective second confidence levels that exceed a confidence level threshold.

At 2308, if one or more of the second classifications have respective second confidence levels that exceed the confidence level threshold, the method selects a second acoustic preset among the acoustic presets (a second particular one of the acoustic presets) based on the second confidence levels of the second classifications, and updates/replaces the acoustic preset with the second acoustic preset for the acoustic environment simulation.

At 2310, if one or more of the second classifications do not have corresponding second confidence levels that exceed the confidence level threshold, the method does not select a second acoustic preset, and does not update/replace the acoustic preset for the acoustic environment simulation.

In methods 2200 and 2300, individual classifications may be based on one image or more than one image. For example, considering the context of classifying a sequence of images (or a sequence of image frames), the methods may classify one image at a time, to produce a separate classification for each image (or image frame); however, the classification preset (i.e., the acoustic preset presented to the AES) changes or updates when there is a significant/substantial difference in a "running average" of confidence levels for classifications from several such images (or image frames). Also, an image under classification may be augmented using multiple images from the image sensor, e.g., by stitching multiple perspectives to generate a less cropped perspective of the environment.

In summary, in one embodiment, a method is provided comprising: receiving an image of a real-world environment; using a machine learning classifier, classifying the image to produce classifications associated with acoustic presets for an acoustic environment simulation, the acoustic presets each including acoustic parameters that represent sound reverberation; and selecting an acoustic preset among the acoustic presets based on the classifications.

In another embodiment, an apparatus is provided comprising: a processor configured to: receive an image of a real-world environment; use a trained machine learning classifier including one or more neural networks to classify the image directly to classifications associated with acoustic presets for an acoustic environment simulation, the acoustic presets each including acoustic parameters that represent sound reverberation; select an acoustic preset among the acoustic presets based on the classifications; and perform the acoustic environment simulation based on the acoustic parameters of the acoustic preset.

In a further embodiment, a non-transitory computer readable medium is provided. The computer readable medium is encoded with instructions that, when executed by a processor, cause the processor to perform the methods presented herein, including to: receive an image of a real-world environment; use a machine learning classifier, previously trained on training images of real-world environments labeled with respective ones of acoustic presets, the acoustic presets each including acoustic parameters that represent sound reverberation, to classify the image directly to classifications associated with the acoustic presets for an acoustic environment simulation; select an acoustic preset among the acoustic presets based on the classifications; and perform the acoustic environment simulation based on the acoustic parameters of the acoustic preset.

In another embodiment, a system is provided comprising: an image sensor to capture an image of a real-world scene; a processor coupled to the image sensor and configured to: implement and use a previously trained machine learning classifier to classify the image directly to classifications associated with acoustic presets for an acoustic environment simulation, the acoustic presets each including acoustic parameters that represent sound reverberation; select an acoustic preset among the acoustic presets based on the classifications; and perform the acoustic environment simulation based on the acoustic parameters of the acoustic preset, to produce a sound signal representative of the acoustic environment simulation; and one or more headphones coupled to the processor and configured to convert the sound signal to sound.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:
receiving an image of a real-world environment;
using a machine learning classifier, trained using training images of real-world environments labeled with one or more room types and training acoustic presets derived from each of the one or more room types, each training acoustic preset having acoustic parameters for sound reverberation including a reverberation decay time, classifying the image to the one or more room types and the acoustic presets associated with the one or more room types, wherein each acoustic preset includes the acoustic parameters for the sound reverberation including the reverberation decay time;
selecting an acoustic preset among the acoustic presets; and
performing an acoustic environment simulation based on the acoustic parameters of the acoustic preset by modeling the sound reverberation for one or more virtual sound objects placed virtually in the real-world environment based on the acoustic parameters of the acoustic preset including the reverberation decay time.

2. The method of claim 1, further comprising:
using the machine learning classifier, classifying the image, or one or more further images, to produce one or more acoustic parameter modifiers; and
modifying the acoustic parameters of the acoustic preset based on the one or more acoustic parameter modifiers, to produce a modified acoustic preset including modified acoustic parameters for the acoustic environment simulation,
wherein performing the acoustic environment simulation includes performing the acoustic environment simulation using the modified acoustic parameters.

3. The method of claim 1, wherein:
the acoustic parameters further include one or more of a frequency dependent decay time, a room size, a reflection delay, an early onset time, and a diffusion level.

4. The method of claim 1, wherein classifying includes classifying the image directly to the acoustic presets, without performing an intervening classification or operation.

5. The method of claim 1, wherein:
classifying includes classifying the image to the acoustic presets such that the acoustic presets have respective confidence levels; and
selecting includes selecting the acoustic preset such that the acoustic preset is associated with a highest one of the respective confidence levels.

6. The method of claim 5, further comprising:
receiving a second image of the real-world environment;
using the machine learning classifier, classifying the second image to produce second acoustic presets that have respective second confidence levels;
determining whether one or more of the respective second confidence levels exceeds a confidence level threshold; and
if one or more of the respective second confidence levels exceeds the confidence level threshold, selecting a second acoustic preset among the acoustic presets, and replacing the acoustic preset with the second acoustic preset for the acoustic environment simulation.

7. The method of claim 6, further comprising:
if one or more of the respective second confidence levels do not exceed the confidence level threshold, not selecting the second acoustic preset, and not replacing the acoustic preset for the acoustic environment simulation.

8. The method of claim 1, wherein receiving the image of the real-world environment includes receiving the image as a 360 degree image of the real-world environment.

9. The method of claim 1, wherein the image represents a composite of different images.

10. The method of claim 1, wherein the acoustic parameters of the acoustic presets were derived algorithmically from acoustic impulse responses representative of the real-world environments represented in the training images on which the machine learning classifier was trained.

11. The method of claim 1, wherein the machine learning classifier was trained on the training images of the real-world environments labeled with respective ones of the acoustic presets that most likely match the real-world environments.

12. The method of claim 1, further comprising:
receiving a digital three-dimensional (3D) mesh (3D mesh); and
estimating acoustic properties of physical materials represented m the 3D mesh, to produce early reflection parameters for the acoustic environment simulation.

13. An apparatus comprising:
a processor configured to:
receive an image of a real-world environment;
use a machine learning classifier including one or more neural networks, trained on training images of real-world environments labeled with one or more room types and training acoustic presets derived from each of the one or more room types, each training acoustic preset having acoustic parameters for sound reverberation including a reverberation decay time, to classify the image to the one or more room types and the acoustic presets associated with the one or more room types, wherein each acoustic preset includes the acoustic parameters for the sound reverberation including the reverberation decay time;
select an acoustic preset among the acoustic presets; and
perform an acoustic environment simulation based on the acoustic parameters of the acoustic preset including the reverberation decay time.

14. The apparatus of claim 13, wherein the processor is configured to perform the acoustic environment simulation by modeling the sound reverberation for one or more virtual sound objects placed virtually in the real-world environment based on the acoustic parameters of the acoustic preset.

15. The apparatus of claim 14, wherein the processor is further configured to:
use the machine learning classifier to further classify the image to produce one or more acoustic parameter modifiers;
modify the acoustic parameters of the acoustic preset based on the one or more acoustic parameter modifiers, to produce a modified acoustic preset including modified acoustic parameters for the acoustic environment simulation; and
further perform the acoustic environment simulation using the modified acoustic parameters.

16. The apparatus of claim 13, wherein:
the acoustic presets have respective confidence levels; and
the processor is configured to select by selecting the acoustic preset that has a highest one of the respective confidence levels.

17. The apparatus of claim 13, wherein the machine learning classifier was trained on the training images of the real-world environments labeled with respective ones of the acoustic presets that most likely match the real-world environments.

18. A non-transitory computer readable medium encoded with instructions that, when executed by a processor, cause the processor to:
receive an image of a real-world environment;
use a machine learning classifier, previously trained on training images of real-world environments labeled with one or more room types and training acoustic presets derived from each of the one or more room types, each training acoustic presets including acoustic parameters that represent sound reverberation including a reverberation decay time, to classify the image directly to the one or more room types and the acoustic presets associated with the one or more room types, each including the acoustic parameters that represent the sound reverberation including the reverberation decay time;
select an acoustic preset among the acoustic presets; and
perform an acoustic environment simulation based on the acoustic parameters of the acoustic preset.

19. The non-transitory computer readable medium of claim 18, wherein the instructions to cause the processor to perform the acoustic environment simulation include instructions to cause the processor to model the sound reverberation for one or more virtual sound objects placed virtually in the real-world environment based on the acoustic parameters of the acoustic preset including the reverberation decay time.

20. The non-transitory computer readable medium of claim 19, further comprising instructions to cause the processor to:
use the machine learning classifier to further classify the image to produce one or more acoustic parameter modifiers;
modify the acoustic parameters of the acoustic preset based on the one or more acoustic parameter modifiers, to produce a modified acoustic preset including modified acoustic parameters for the acoustic environment simulation; and
further perform the acoustic environment simulation using the modified acoustic parameters.

* * * * *